United States Patent

Fuchigami et al.

[11] Patent Number: 6,160,953
[45] Date of Patent: Dec. 12, 2000

[54] DVD-COMPATIBLE OPTICAL RECORDING DISK CONVEYING AUDIO SIGNALS ENCODED BOTH AS PCM DATA AND AS SINGLE BIT STREAM DATA GENERATED BY SIGMA-DELTA MODULATION, AND ENCODER APPARATUS AND DECODER APPARATUS FOR SAME

[75] Inventors: Norihiko Fuchigami, Yamato; Shoji Ueno; Yoshiaki Tanaka, both of Fujisawa, all of Japan

[73] Assignee: Victor Company of Japan, Ltd., Yokohama, Japan

[21] Appl. No.: 08/939,058

[22] Filed: Sep. 29, 1997

[30] Foreign Application Priority Data

Apr. 21, 1997 [JP] Japan ................................ 9-117604

[51] Int. Cl.[7] .................................................. H04N 5/928
[52] U.S. Cl. ........................................ 386/105; 386/126
[58] Field of Search .............................. 386/46, 104, 105, 386/106, 98, 125, 126, 95; 369/32, 48, 59; H04N 5/928

[56] References Cited

U.S. PATENT DOCUMENTS 5,404,248  4/1995  Shimoda et al. ..................... 386/117
5,748,835  5/1998  Lee ..................................... 386/104
5,819,004  10/1998  Azadegan et al. ................. 386/125
5,872,755  2/1999  Inazawa et al. ..................... 369/59

FOREIGN PATENT DOCUMENTS 6-232755  8/1994  Japan .
8-265899  10/1996  Japan .

Primary Examiner—Huy Nguyen
Attorney, Agent, or Firm—Anderson, Kill & Olick P.C.

[57] ABSTRACT

An optical recording disk has audio signals recorded as data encoded in accordance with DVD specifications, both as PCM data and as single bit stream data that are generated by sigma-delta modulation, thereby providing both the improved audio reproduction capability of single bit stream data and also compatibility with existing types of DVD playback apparatus. Data are recorded using proposed new DVD stream modes, having 10 data channels, 48 kHz PCM sampling frequency and 16 or 20 bits/sample, with the ratio (2:8) of data channel capacities allocated to the PCM data and single bit stream data being made identical to the ratio of the respective bit rates at which the PCM data and single bit stream data are generated.

22 Claims, 23 Drawing Sheets

FIG. 22
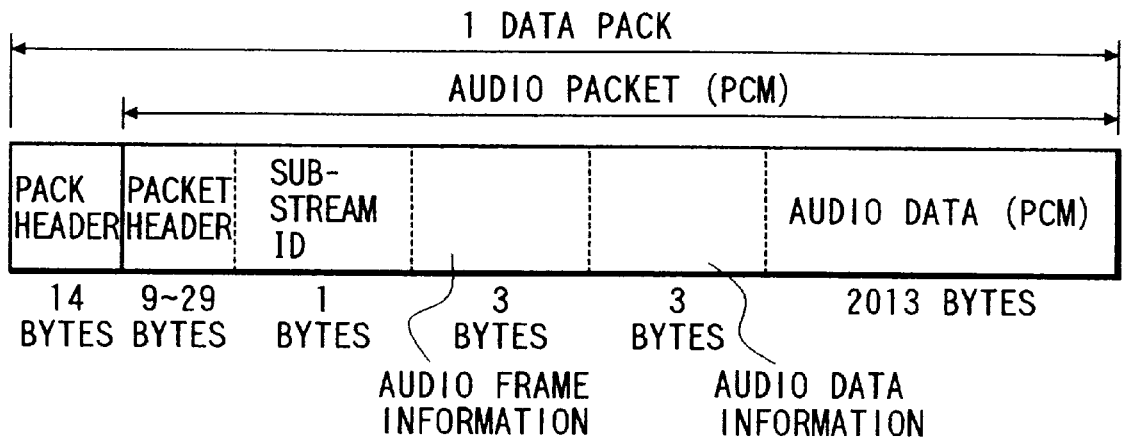
FIG. 23
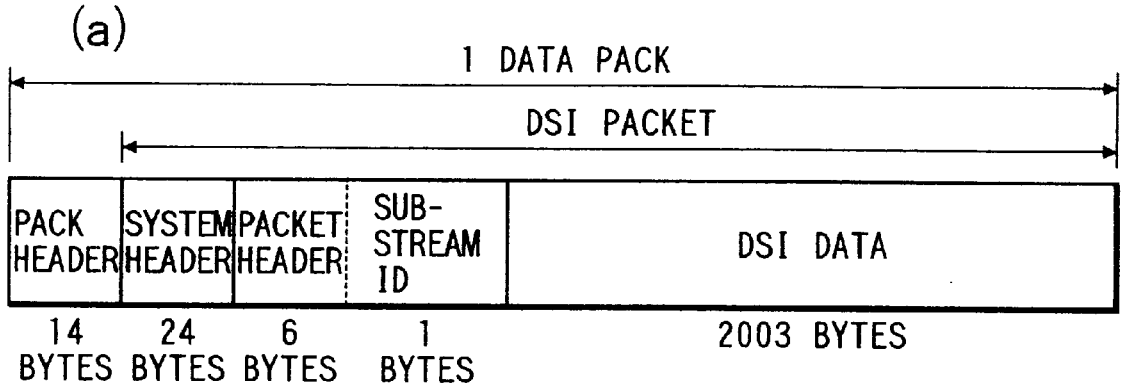
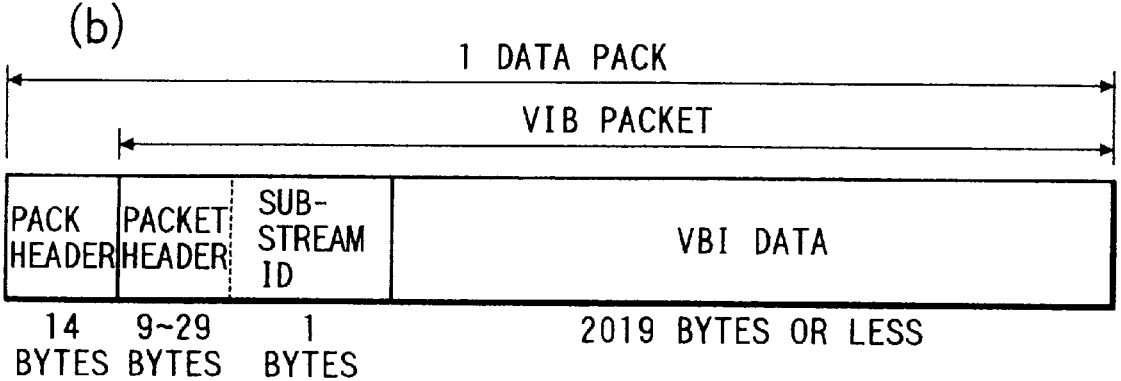

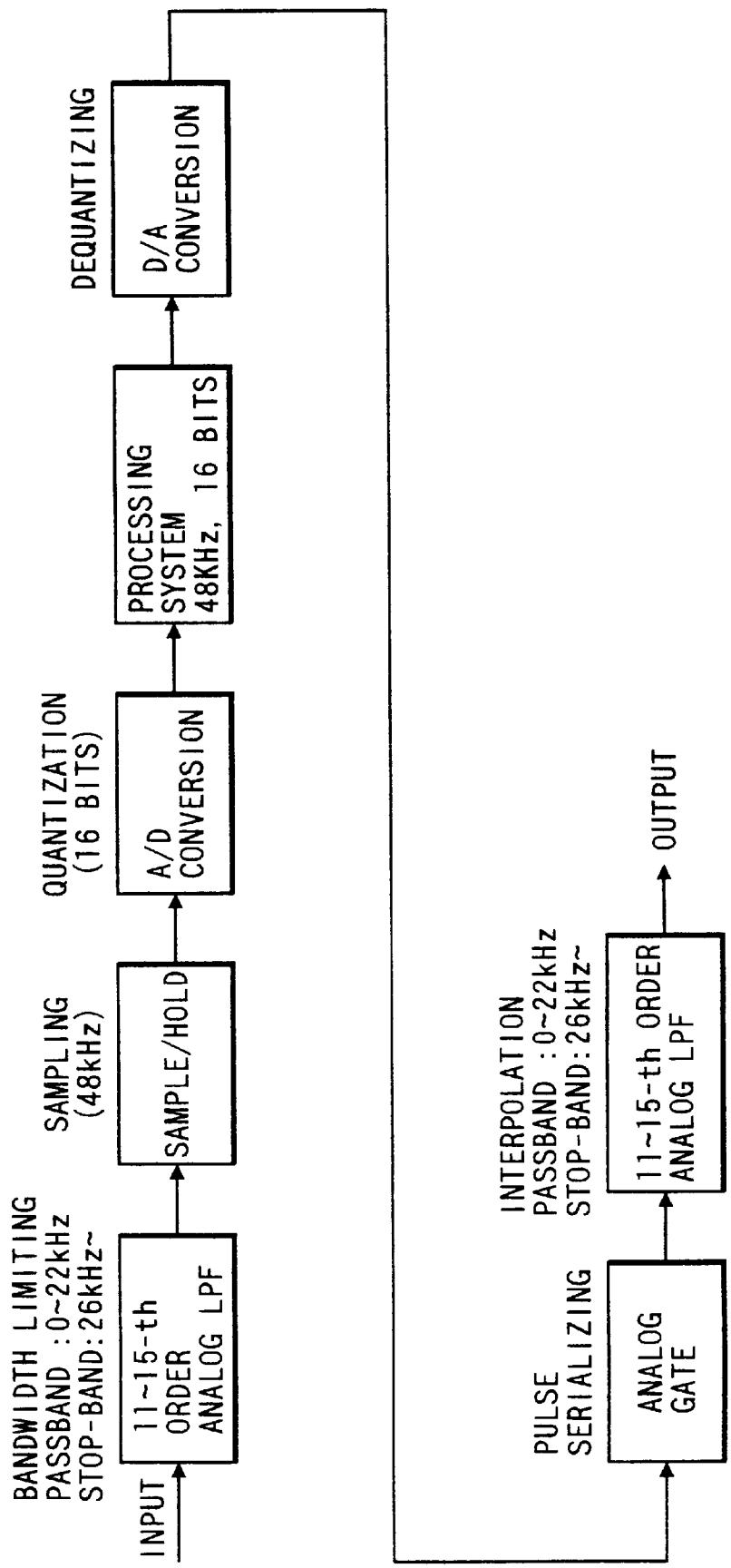

TABLE 1

| STREAM MODE | | | AMOUNT OF DATA/PACKET | |
|---|---|---|---|---|
| NO. OF CHANNELS | SAMPLING FREQ. (kHz) | BITS/ SAMPLE | MAXIMUM NO. OF SAMPLES/PACKET | DATA SIZE (BYTES) |
| 1 (MONO) | 48/96 | 16 | 1004 | 2008 |
| | 48/96 | 20 | 804 | 2010 |
| | 48/96 | 24 | 670 | 2010 |
| 2 (STEREO) | 48/96 | 16 | 502 | 2008 |
| | 48/96 | 20 | 402 | 2010 |
| | 48/96 | 24 | 334 | 2004 |
| 3 | 48/96 | 16 | 334 | 2004 |
| | 48/96 | 20 | 268 | 2010 |
| | 48 | 24 | 222 | 1998 |
| 4 | 48/96 | 16 | 250 | 2000 |
| | 48 | 20 | 200 | 2000 |
| | 48 | 24 | 166 | 1992 |
| 5 | 48 | 16 | 200 | 2000 |
| | 48 | 20 | 160 | 2000 |
| | 48 | 24 | 134 | 2010 |
| 6 | 48 | 16 | 166 | 1992 |
| | 48 | 20 | 134 | 2010 |
| 7 | 48 | 16 | 142 | 1998 |
| 8 | 48 | 16 | 124 | 1984 |

*FIG. 25*
PRIOR ART

TABLE 2

| STREAM MODE | | | AMOUNT OF DATA/PACKET | |
|---|---|---|---|---|
| NO. OF CHANNELS | SAMPLING FREQ. (kHz) | BITS/ SAMPLE | MAXIMUM NO. OF SAMPLES/PACKET | DATA SIZE (BYTES) |
| 1 (MONO) | 48/96 | 16 | 1004 | 2008 |
| | 48/96 | 20 | 804 | 2010 |
| | 48/96 | 24 | 670 | 2010 |
| 2 (STEREO) | 48/96 | 16 | 502 | 2008 |
| | 48/96 | 20 | 402 | 2010 |
| | 48/96 | 24 | 334 | 2004 |
| 3 | 48/96 | 16 | 334 | 2004 |
| | 48/96 | 20 | 268 | 2010 |
| | 48/96 | 24 | 222 | 1998 |
| 4 | 48/96 | 16 | 250 | 2000 |
| | 48/96 | 20 | 200 | 2000 |
| | 48/96 | 24 | 166 | 1992 |
| 5 | 48/96 | 16 | 200 | 2000 |
| | 48/96 | 20 | 160 | 2000 |
| | 48 | 24 | 134 | 2010 |
| 6 | 48/96 | 16 | 166 | 1992 |
| | 48 | 20 | 134 | 2010 |
| | 48 | 24 | 111 | 1998 |
| 7 | 48 | 16 | 142 | 1998 |
| | 48 | 20 | 114 | 2006 |
| | 48 | 24 | 94 | 1992 |
| 8 | 48 | 16 | 124 | 1984 |
| | 48 | 20 | 100 | 2000 |
| | 48 | 24 | 82 | 1968 |

*FIG. 26*
PRIOR ART

TABLE 3

| STREAM MODE | | | AMOUNT OF DATA/PACKET | |
|---|---|---|---|---|
| NO. OF CHANNELS | SAMPLING FREQ. (kHz) | BITS/ SAMPLE | MAXIMUM NO. OF SAMPLES/PACKET | DATA SIZE (BYTES) |
| 10 | 48/96 | 16 | 100 | 2000 |
| | 48/96 | 20 | 80 | 2000 |

*FIG. 27*

DVD-COMPATIBLE OPTICAL RECORDING DISK CONVEYING AUDIO SIGNALS ENCODED BOTH AS PCM DATA AND AS SINGLE BIT STREAM DATA GENERATED BY SIGMA-DELTA MODULATION, AND ENCODER APPARATUS AND DECODER APPARATUS FOR SAME

BACKGROUND OF THE INVENTION

1. Field of the Invention

The present invention relates in general to audio optical recording disks for recording audio signals as digital data, and to an encoder apparatus and decoder apparatus for recording and playback of data to/from such a disk. In particular, the invention relates to a new type of audio optical recording disk which is in accordance with DVD (digital video disk) standards and which enables selection of playback of recorded audio data as either PCM (pulse code modulation) data or as single bit stream data which has been generated by sigma-delta modulation, and to types of encoder apparatus and decoder apparatus which are suitable for use with such a disk.

2. Prior Art

More than ten years have passed since the CD (compact disk) was first marketed as an optical recording disk having audio signals recorded thereon in digital form, and CDs have already surpassed cassette tapes as the main medium used for audio recording. Various types of data (Eight to Fourteen) modulation and recording method which utilizes 8-bit fixed-length data symbols, and the CRC method, etc. CD players have been correspondingly developed, having various types of added application functions.

An audio signal is recorded on a CD by encoding as PCM data, using a sampling frequency of 44.1 kHz and 16 bits per sample (i.e. 16 quantization bits), for each of the left (L) and right (R) channel stereophonic signals. Such recording provides a reproduction bandwidth of approximately 22 kHz, and a S/N (signal-to-noise) ratio of approximately 96 dB. In the case of CD-ROMs which are used for example in the field of electronic publishing, audio data are generally recorded on such a disk by using ADPCM (Adaptive Differential Pulse Code Modulation) to compress the data. As a result, the reproduced sound quality obtainable is inferior to that obtainable by audio CDs.

In recent years, it has come to be realized that the playback characteristics of the conventional type of CD are unsatisfactory, with respect to the reproduction bandwidth (i.e. the bandwidth of the analog audio signal obtained by playback of data from such a disk) and the signal/noise ratio, and that there is a need to establish standards for a next-generation audio recording disk which will have superior characteristics. Basically, the requirements for the characteristics of such a new type of audio recording disk would be as follows: a reproduction bandwidth of 100 kHz and a signal/noise ratio that is in the range 120 to 144 dB.

One method which is receiving attention for the purposes of implementing such a type of audio disk is the single bit stream method, whereby a stream of successive single bits (as respective sample values) is produced as a result of A/D (analog-to-digital) conversion of an analog audio signal, rather than a stream of successive multi-bit sample values. This type of A/D conversion can be performed by sigma-delta modulation, for example as described in Japanese Patent Application Laid-open (HEI) 6-232755. FIGS. 24A to 24D are respective block system diagrams for illustrating different methods of A/D and subsequent D/A (digital-to-analog) conversion applied to analog audio signals, for transfer through a processing system such as an optical disk recording/playback system. FIG. 24D illustrates the sigma-delta modulation method for generating single bit stream data. As shown, conversion of an analog audio signal to a stream of single bit stream data is performed by first transferring the analog audio signal through a first or second-order analog LPF (low-pass filter) 200, then supplying the resultant signal to an analog sigma-delta modulator 201. In this example, the sigma-delta modulator 201 consists of an input subtractor, an integrator receiving the output signal from the subtractor, a 1-bit quantizer which operates at a fixed quantization frequency and operates on the output signal from the integrator, and a feedback delay element ($Z^{-1}$) providing a delay amount which is equal to one quantization period, so that the subtractor subtracts the delayed output signal of the quantizer from the input signal of the integrator. Since the principles of sigma-delta modulation are now well known, detailed description will be omitted. The resultant output flow of successive 1 or 0-state bits (referred to herein as "single bit stream data) can be supplied directly to a recording system to be recorded on an optical recording disk, and playback of the optical recording disk can subsequently be performed. Such recording and playback operations are represented as a "processing system" 202. In this example, the sigma-delta modulation sampling frequency (i.e. the bit rate of the resultant data stream) is assumed to be 768 kHz.

By comparison with the conventional PCM method used for audio CDs which is shown in FIG. 24A, the oversampling method which is shown in FIG. 24B, or the analog sigma-delta modulation method which is shown in FIG. 24C (in which each sample that is obtained by the sigma-delta modulation process is encoded as a plurality of bits rather than as a single bit), the single bit stream type of sigma-delta modulation has the following advantages:

(1) The sampling frequency (i.e. the bit rate) can be made sufficiently high to enable very effective noise shaping to be achieved. As a result, an excellent signal/noise ratio can be attained.

(2) By comparison with the conventional PCM method, the reproduction bandwidth can be made substantially wider.

(3) With the single bit stream method, the part of a playback system which recovers an original analog audio signal from a stream of digital data can be made extremely simple, i.e. only an analog LPF is necessary. With the conventional methods of FIGS. 24A to 24C, on the other hand, it is necessary to utilize a D/A converter to implement that function.

As a specific example, using the single bit stream method with a sampling frequency which is 66 times the PCM sampling frequency of conventional audio CDs (44.1 kHz), the sampling frequency becomes (66×44.1 kHz)=2.82 MHz, i.e. the bit rate of the resultant data stream is 2.82 Mbps. In that case, the reproduction bandwidth is 100 kHz, and the signal/noise ratio of the reproduced analog audio signal is approximately 120 dB.

With the prior art PCM method on the other hand, to achieve such results, it would be necessary to use for example a sampling frequency of 200 kHz with 20 bits per sample, so that the transmission frequency of the resultant data would be 4.00 MHz. The superiority of the single bit stream method is therefore apparent.

It can thus be understood that adoption of the single bit stream method for recording audio signals on optical recording disks would enable the defects of prior art types of audio CD to be overcome, so that it can be expected that the single bit stream method will become widely adopted in the field of audio recording technology. However most of the digital audio recording and playback equipment which is now in existence is designed for use with the conventional PCM method, and of course most of the recorded media which are now available utilize the PCM data format. It would not be practicable, therefore, to expect the users of such optical recording disks to immediately switch over to use of the single bit stream method.

On the other hand, standards have already been established for DVDs, which are expected to become widely used in the field of multimedia, and DVD playback systems and AV (audio-video) software are already being marketed, based on the standards which have been established. It can thus be anticipated that DVDs will come into widespread use, as a high-density recording medium. Basic DVD standards which have been established include the DVD-Video standards, for video disk applications, the DVD-ROM standards, for ROM (read-only memory) and the DVD-RAM standards, for RAM (random access memory) applications. Respective standards for the data pack formats of these have been established.

Such data pack format standards are illustrated in FIGS. 20 to 23. FIG. 20 shows the basic format of a DVD data pack. FIG. 21 shows the format of a video pack which conveys video data, FIG. 22 shows the format of an audio pack, for the case in which audio signals are encoded as PCM data, FIG. 23(a) shows the format of a DSI (Data Search Information) video pack, and FIG. 23(b) shows the format of a VBI (Video Blanking Information) video pack.

It should be noted that the format standards for PCM data in audio packs are not limited to that shown for PCM data in FIG. 22. Other audio pack format standards include those established for audio which accompanies various types of video signal, e.g. for the Dolby AC-3 audio system (in accordance with the NTSC video system) system, and for the MPEG (Moving Pictures Experts Group) audio system (in accordance with the PAL, SECAM video systems).

Hence, considering the widespread popularity which can be anticipated for DVDs in the future, it would be very advantageous to be able to make the single bit stream method compatible with the existing DVD standards. In that way, the advantages of the single bit stream method with regard to increased reproduction bandwidth and improved signal/noise ratio could be made widely available to users. In particular, it should be possible to ensure compatibility with the PCM data format for audio signals, specified in the DVD standards.

SUMMARY OF THE INVENTION

It is an objective of the present invention to provide an optical recording disk for audio reproduction applications, which utilize a new stream mode for audio packets that is in addition to existing stream modes for audio packets conveying audio data encoded by PCM, i.e. is in addition to the existing stream modes which are specified in existing DVD standards for such audio packets, and to thereby provide an optical recording disk on which audio data are recorded both as PCM data and also as single bit stream data. Such an optical recording disk will provide the improved characteristics of the single bit stream method as described hereinabove, by comparison with that attainable with conventional CDs or with existing audio data recorded on DVDs (i.e. as PCM data), while at the same time having data recorded thereon in a format which is based on the DVD standards.

It is a further objective of the present invention to provide an encoder apparatus for encoding an analog audio signal to obtain data to be recorded on such an optical recording disk, and a decoder apparatus for decoding data which are read from such an optical recording disk to thereby recover an original analog audio signal.

Since the term "channel" may be assigned various different significances, the following practice is followed within this specification and in the appended claims. A channel which is one of a plurality of audio sound channels, such as the stereo R and L channels, will be referred to as an audio channel. A channel which is constituted by periodically occurring sets of bits within a time-division multiplexed data stream (and in particular, within each audio data portion of each of respective audio packets within a stream of DVD data packs) will be referred to as a data channel.

To obtain the above objectives, according to a first aspect the invention provides an optical recording disk having recorded thereon successive portions of a stream of digitally encoded audio data, as respective audio data portions of successive audio packets, in a stream mode which is supplementary to existing stream modes having from 1 to 8 channels that are established for audio packets recorded in PCM form in accordance with a DVD standard, the supplementary stream mode comprising a cyclically recurring sequence of 10 sets of a fixed number of bits, where the fixed number is either 16 or 20, the sets respectively corresponding to 10 data channels, wherein first and second ones of the 10 data channels respectively convey left (L) channel and right (R) channel analog audio signals respectively encoded as PCM data streams with the fixed number of bits per data sample, and a remaining 8 of the data channels convey the L channel analog audio signal and the R channel analog audio signal encoded by sigma-delta modulation as respective streams of single bit sequence data, and wherein each of the audio packets includes an ADI portion containing discrimination data specifying that the audio data portion of the audio packet has been recorded in the supplementary stream mode.

With such an optical recording disk, if the PCM data have been encoded at a sampling frequency of 48 kHz, then the single bit sequence data are preferably encoded at a bit frequency of 3.072 Mbps when the fixed number of bits has been set as 16, and encoded at a bit frequency of 3.840 Mbps when the fixed number of bits has been set as 20.

The above features can be understood as follows, referring to FIGS. 25–27, respectively illustrating Tables 1 to 3. Table 1 shows the 8 stream modes, utilizing from one to eight data channels with a data transfer rate of 6.144 MHz, which are specified for audio packets which convey audio data encoded in PCM form by the originally established DVD standards. Subsequently, additional standards for such DVD audio packets have been proposed, since it has been found that the data transfer rate set by the original standards is not sufficiently high. Table 2 shows these proposed new standards for 8 stream modes. These are based on a data transfer rate of 9.8 Mbps, and so provide substantially increased data transfer bandwidth.

With the present invention, it is proposed to establish standards for a new stream mode, for 10-channel data transfer by DVD audio packets. The embodiments of the invention described herein assume the use of this new stream mode, whose specifications are as shown in Table 3. In Table 3, it should be noted that the values of sampling frequency $f_s$ (48 kHz) and possible numbers of bits/sample (16 or 20) apply to PCM data samples, although both PCM data and single bit stream data are conveyed together by the 10 channels. It should also be noted that the value of "number of samples within each packet" actually refers to a total number of [PCM samples+(16–12 bit or 20-bit sets of single bit stream data] within each packet. It should be further noted that the values shown for "number of samples within each packet" and "data size" (i.e. amount of audio data conveyed by each packet) are given by way of example, and that the invention is not limited to the use of these specific values.

As a specific example of using this new stream mode, if two (L channel, R channel) analog audio signals are encoded by PCM at a sampling frequency of 48 kHz, with the number of quantization bits (i.e. bits per sample) being 16, then the basic data transfer rate (i.e. the rate at which the encoded data are generated is 1.536 Mbps (i.e. 2×48×16). If the same two analog audio signals are encoded in single bit stream form by sigma-delta modulation, and if the basic data transfer rate is made four times that of the PCM data (i.e. is made 6.144 Mbps), then it will be apparent that it becomes possible to convey the PCM data (time-axis compressed to a data rate of 6.144 MHz) by two of the 10 data channels, and convey the single bit stream data by the remaining 8 channels, then the respective data flows can be exactly matched to the channel carrying capacities (i.e. since the ratio of these capacities is 2:8, i.e. 1:4). This can be achieved by encoding each of the L and R channel analog audio signals as single bit stream data at a rate of 6.144/2 Mbps, i.e. 3.072 Mbps, assigning the resultant L channel single bit stream data to four of the aforementioned 8 remaining data channels, and assigning the resultant R channel single bit stream data to the remaining four data channels. In that way, the L and R channel analog audio signals can be conveyed by the 10 data channels as both PCM data and single bit stream data.

It will be apparent that such an optical recording disk will enable selective playback of the two differently encoded types of data, each expressing the L and R channel analog audio signals, i.e. by selecting the contents of the first two channels of the 10 data channels of the playback data flow read from such a disk, PCM data is obtained, which can be supplied to any existing audio system which has been designed to operate on PCM-encoded audio data which are read out from a DVD. Alternatively, by selecting the contents of the remaining 8 channels of the 10 data channels of the playback data flow, single bit stream data are obtained, which can be supplied to an audio system that has been designed to utilize the superior reproduction characteristics available with the single bit stream method.

According to a second aspect, the invention provides an encoder apparatus for generating a recording signal for recording data in the supplementary mode on such an optical recording disk, with the encoder apparatus comprising:

first and second sigma-delta modulators for respectively converting the L channel analog audio signal and R channel analog audio signal to first and second streams of single bit sequence data, data converter means for converting the first and second streams of single bit sequence data to respective first and second PCM data streams at the sampling frequency of 48 kHz and with the fixed number of bits per data sample, and formatting means for generating each of the audio data portions of respective audio packets by assigning respective bits of the first and second PCM data streams to the first and second data channels, and assigning respective bits of the first and second streams of single bit sequence data to the remaining 8 sets of the 10 data channels, for generating the ADI portion of the audio packet, containing the discrimination data, and for attaching the ADI portion to the audio data portion.

With such an encoder apparatus, the L and R channel analog audio signals are each converted to single bit stream data form, by sigma-delta modulation using 1-bit quantization and the single bit stream data are then converted to PCM data by data conversion means. Assuming that the PCM sample rate is 48 kHz, then if the number of bits/sample is 16, the bit rate of the single bit stream data should be 3.072 Mbps, while if the number of bits/sample of the PCM data is 20, then the bit rate of the single bit stream data should be 3.840 Mbps. The formatting means, operating on the basis of a stream mode shown in Table 3, allocates the PCM data to two of the 10 data channels, and allocates the single bit stream data to the remaining 8 of the 10 data channels. In addition, to provide an indication that the optical recording disk has data recorded in accordance with a special stream mode, discrimination data indicating that fact are recorded within the ADI section of each audio packet.

Alternatively, the PCM data recorded on the optical recording disk may have been encoded at a sampling frequency of 44.1 kHz, with the single bit sequence data encoded at a bit frequency of 3.072 Mbps when the fixed number of bits has been set as 16 and encoded at a bit frequency of 3.840 Mbps when the fixed number of bits has been set as 20, and with a number of audio data bits of the PCM data of each of the first and second data channels in each of the audio data portions having been made equal to a total number of bits of the PCM data multiplied by a factor (44.1/48), through insertion of a predetermined number of padding bits in addition to the PCM data in each of the first and second data channels of the audio data portion, and with the discrimination data of each ADI portion further containing sampling frequency indication data specifying that the PCM data have been generated at a sampling frequency of 44.1 kHz.

With such an optical recording disk, the PCM data are recorded at a sample frequency of 44.1 kHz, which is the standard sampling frequency used for PCM data recorded on CDs, as opposed to the sampling frequency of 48 kHz which is utilized for PCM audio data recorded on DVDs. As a result, the quantity of PCM audio data recorded in each audio packet must be reduced by comparison with the case in which the sampling frequency is 48 kHz, i.e. reduced by a factor of 44.1/48. For that reason, padding bits are attached to the PCM audio data in each of the data channels in each of the audio packets, such as to maintain a ratio of 2:8 between the amounts of data recorded in PCM form and data recorded in single bit stream form. It is ensured that such padding bits will have no effect upon the reproduced audio signal, e.g. by making these all "0" bits. In addition, the encoder apparatus inserts discrimination data into the ADI sections of the audio packets, which indicates that the audio portion of each packet has been recorded using a special stream mode, i.e. indicating one of the modes shown in Table 3 while also indicating that the PCM audio data have been recorded using a sampling frequency of 44.1 kHz, rather than 48 kHz.

According to a third aspect, the invention provides an encoder apparatus for generating a recording signal for recording data in the supplementary mode on such an optical recording disk in which PCM data have been recorded using a sampling frequency of 44.1 kHz, with the encoder apparatus comprising:

first and second sigma-delta modulators for respectively converting the L channel and R channel analog audio signals to first and second streams of single bit sequence data, data converter means for converting the first and second streams of single bit stream data to respective first and second PCM data streams at the sampling frequency of 44.1 kHz and with the fixed number of bits per data sample, and formatting means for generating each of the audio data portions of respective audio packets by assigning respective bits of the first and second PCM data streams and the padding bits to the first and second data channels, and assigning respective bits of the first single bit sequence data and second single bit sequence data to the remaining 8 sets of the 10 data channels, for generating the ADI portion of the audio packet, containing the discrimination data, and for attaching the ADI portion to the audio data portion.

Thus with such an encoder apparatus, the PCM data are recorded on two of the 10 data channels of one of the stream modes shown in Table 3, at a sampling frequency of 44.1 kHz, and the formatting means periodically attaches sets of the aforementioned padding bits to the recorded PCM data of each of the two data channels. In other respects, it can be understood that the basic configuration of such an encoder apparatus is substantially identical to that of an encoder apparatus according to the present invention for recording audio data on optical recording disks with a PCM sampling frequency of 48 kHz.

According to a fourth aspect, the invention provides a decoder apparatus for operating on a playback data stream read from either of the two types of optical recording disk defined above, with the decoder apparatus comprising mode setting means for selectively setting a PCM decoding mode and a single bit sequence decoding mode, discrimination means for detecting the discrimination data of the ADI portions of the playback data stream, and for judging the discrimination data to determine whether the optical recording disk has audio data recorded thereon in the supplementary stream mode, deformatting means functioning, when the discrimination means has determined that the optical recording disk has audio data recorded thereon in the supplementary stream mode, to separate the PCM data conveyed by the first and second data channels and the single bit sequence data conveyed by the remaining 8 data channels of the playback data stream into a first output data stream (SA) and second output data stream (SB) respectively, and for producing only the first output data stream (SA) when the PCM decoding mode has been set and producing only the second output data stream (SB) when the single bit sequence decoding mode has been set, first channel separator means (42) for separating and processing the first output data stream (SA) into a stream of PCM data corresponding to the L channel analog audio signal and a stream of PCM data corresponding to the R channel analog audio signal.

first and second D/A (Digital-to-Analog) converter means (44, 45) for respectively converting the streams of PCM samples corresponding to the the L channel analog audio signal and R channel analog audio signal to the L and R channel analog audio signals respectively, second channel separator means (43) for separating and processing the second output data stream (SB) into a stream of single bit sequence data corresponding to the L channel analog audio signal and a stream of single bit sequence data corresponding to the R channel analog audio signal, and first and second low-pass filters (46, 47) for respectively converting the streams of single bit sequence data corresponding to the L channel analog audio signal and R channel analog audio signal to the L channel and R channel analog audio signals.

As described hereinafter referring to preferred embodiments, such a decoder apparatus can be configured to process the playback data from either of the two types of optical recording disk according to the present invention described above, i.e. utilizing either a 48 kHz or a 44.1 kHz sampling frequency for PCM data. Specifically, the decoder apparatus judges (based on the discrimination data contained in the ADI sections of reproduced audio packets) whether the optical recording disk has recorded thereon and data in both PCM and single bit stream form, and if so, the type of PCM data. The deformatting section of the decoder apparatus then separates the playback data into the two PCM data channels and the single bit stream data. The user can selectively specify audio signal reproduction using either the PCM data or the single bit stream data, by using a mode setting means. Irrespective of which mode is specified, the selected encoded data are converted into two data streams corresponding to the L and R analog audio signals. If the PCM playback mode has been selected, then these two data streams are supplied to respective A/D converters, while if the single bit stream data playback mode has been selected, the two data streams are supplied to respective low-pass filters, to obtain the desired L and R channel analog audio signals.

If it is found from the discrimination data of the ADI sections that the PCM data have been recorded at the 44.1 kHz sampling frequency, i.e. with padding bits inserted, then the deformatting means will ignore any string of "0" bits, i.e. such bits will not be treated as PCM audio data bits and so will have no effect.

According to a fifth aspect, the invention provides an optical recording disk having recorded thereon successive portions of a stream of digitally encoded audio data, as respective audio data portions of successive audio packets, in a stream mode which is supplementary to existing stream modes having from 1 to 8 channels that are established for audio packets recorded in PCM form in accordance with a DVD standard, the supplementary stream mode comprising a cyclically recurring sequence of 10 sets of a fixed number of bits, where the fixed number is predetermined as either 16 or 20, the sets respectively corresponding to 10 data channels, wherein first and second ones of the 10 data channels respectively convey, encoded as respective PCM data streams with the fixed number of bits per data sample, first (Lt) and second (Rt) combination channel signals which in combination convey three front channel (L, C, R) analog audio signals and one rear channel (R) analog audio signal, with the front channel and rear channel analog audio signals having been encoded to form the first (Lt) and second (Rt) combination channel signals by the Dolby Surround encoding method, wherein a remaining 8 of the data channels convey the three front channel and single rear channel analog audio signals encoded by sigma-delta modulation as respective streams of single bit sequence data, and wherein each of the audio packets includes an ADI portion containing discrimination data specifying that the audio data portion of the audio packet has been recorded in the supplementary stream mode and specifying that the first and second combination channel signals have been generated by the Dolby Surround encoding method.

According to a sixth aspect, the invention provides an encoder apparatus for generating a recording signal for recording data in the supplementary stream mode on such an optical recording disk, with the encoder apparatus comprising:

sigma-delta modulators for converting the three front channel (L, C, R) analog audio signals and one rear channel (R) analog audio signal to respective ones of 4 streams of single bit sequence data, encoding means for encoding the streams of single bit sequence data to form the first and second combination channel signals (Lt, Rt) as respective streams of single bit sequence data, by the Dolby Surround encoding method, first and second data converter means for converting the first and second combination channel signals (Lt, Rt) to respective first and second PCM data streams at the sampling frequency of 48 kHz and with the fixed number of bits per data sample, bandwidth compression means for applying bandwidth compression by a factor of ½ to each of the 4 streams of single bit sequence data, and formatting means for generating each of the audio data portions of respective audio packets by assigning respective bits of the first and second PCM data streams to the first and second data channels and assigning respective bits of the 4 streams of single bit sequence data to the remaining 8 data channels, for generating the ADI portion of the audio packet, containing the discrimination data, and for attaching the ADI portion to the audio data portion.

According to a sixth aspect, the invention provides an encoder apparatus for operating on a playback data stream read from such an optical recording disk, with the encoder apparatus comprising:

mode setting means for selectively setting a PCM decoding mode and a single bit sequence decoding mode, discrimination means for detecting the discrimination data of the ADI portions of the playback data stream, for thereby judging whether the optical recording disk has audio data recorded thereon in the supplementary stream mode and whether the audio data include the Dolby Surround encoded data, deformatting means functioning, when the discrimination means has determined that the optical recording disk has audio data recorded thereon in the supplementary stream mode and that the recorded data include the Dolby Surround encoded data, to separate the PCM data conveyed by the first and second data channels and the single bit sequence data conveyed by the remaining 8 data channels of the playback data stream into a first output data stream (SA) and second data stream (SB) respectively, and for producing only the first output data stream (SA) when the PCM decoding mode has been set and producing only the second output data stream (SB) when the single bit sequence decoding mode has been set, first channel separator means for separating and processing the first output data stream (SA) to obtain the first combination channel signal (Lt) and second combination channel signal (Rt) as respective PCM data streams, decoding means for decoding the first and second combination channel signals to obtain four PCM data streams respectively corresponding to the four channel (L, C, R, S) analog audio signals, digital-to-analog converter means for converting the four PCM data streams to the four channel (L, C, R, S) analog audio channel signals respectively, second channel separator means for separating and processing the second output data stream into four streams of single bit sequence data respectively corresponding to the four channel (L, C, R, S) analog audio signals, and low-pass filter means for converting the four streams of single bit sequence data to the four-channel (L, C, R, S) analog audio signals.

According to a seventh aspect, the invention provides an optical recording disk having recorded thereon successive portions of a stream of digitally encoded audio data, as respective audio data portions of successive audio packets, in a stream mode which is supplementary to existing stream modes having from 1 to 8 channels that are established for audio packets recorded in PCM form in accordance with a DVD standard, the supplementary stream mode comprising a cyclically recurring sequence of 10 sets of a fixed number of bits, where the fixed number is predetermined as either 16 or 20, the sets respectively corresponding to 10 data channels, wherein first and second ones of the 10 data channels convey, encoded as PCM data with the fixed number of bits per sample, a stream of combination audio data derived by encoding N-channel analog audio signals using a predetermined audio channel encoding method, where N is a fixed plural integer, wherein a remaining 8 of the data channels convey the combination audio data, encoded by sigma-delta modulation as respective streams of single bit sequence data, and wherein each of the audio packets includes an ADI portion containing discrimination data specifying that the audio data portion of the audio packet has been recorded in the supplementary stream mode and specifying that the packet conveys combination audio data which have been generated by the predetermined audio channel encoding method.

According to an eighth aspect, the invention provides an encoder apparatus for generating a recording signal for recording data in the supplementary stream mode on such an optical recording disk, with the encoder apparatus comprising:

sigma-delta modulators for converting the N-channel analog audio signals to respective streams of single bit sequence data, encoding means for encoding the streams of single bit sequence data to form the combination audio data, by the predetermined audio channel encoding method, data converter means for converting the combination audio data stream to a PCM data stream at the sampling frequency of 48 kHz and with the fixed number of bits per data sample, bandwidth compression means for applying bandwidth compression by a factor of 2/N to each of the streams of single bit sequence data, and formatting means for generating each of the audio data portions of respective audio packets by assigning respective bits of the PCM data stream to the first and second data channels and assigning respective bits of the each of the streams of single bit sequence data to the remaining 8 data channels, for generating the ADI portion of the audio packet, containing the discrimination data, and for attaching the ADI portion to the audio data portion.

According to a ninth aspect, the invention provides a decoder apparatus for operating on a playback data stream read from such an optical recording disk, with the decoder apparatus comprising mode setting means for selectively setting a PCM decoding mode and a single bit sequence decoding mode, discrimination means for detecting the discrimination data of the ADI portions of the playback data stream, for thereby judging whether the optical recording disk has audio data recorded thereon in the supplementary stream mode and whether the audio data include combination audio data encoded by the predetermined audio channel encoding method, deformatting means functioning, when the discrimination means has determined that the optical recording disk has audio data recorded thereon in the supplementary stream mode and that the recorded data include the combination audio data encoded by the predetermined audio channel encoding method, to separate the PCM data conveyed by the first and second data channels and the single bit sequence data conveyed by the remaining 8 data channels of the playback data stream into a first output data stream and second data stream respectively, and for producing only the first output data stream when the PCM decoding mode has been set and producing only the second output data stream when the single bit sequence decoding mode has been set, decoding means for operating on the first output data stream to obtain N streams of PCM audio data respectively corresponding to the N-channel analog audio signals.

N-channel analog-to-digital converter means for converting the N channels of PCM audio data to the N-channel analog audio signals, channel separator means for separating and processing the second output data stream into N streams of single bit sequence data respectively corresponding to the N-channel analog audio signals, and N low-pass filters for respectively converting the N streams of single bit sequence data to the N-channel analog audio signals.

The audio channel encoding method used with such an optical recording disk may be in accordance with the Dolby AC-3 multi-channel audio system. Alternatively, it may be in accordance with the DTS (Digital Theater System) multi-channel audio system, or the SDDS (Sony Dynamic Digital Sound) multi-channel audio system.

It can thus be understood that by using the proposed stream modes of FIG. 3 for optical recording disks according to the present invention, it becomes possible to record two-channel or multi-channel analog audio signals as PCM data on two of the 10 data channels of such a stream mode and to also record these analog audio signals as single bit stream data on the remaining 8 data channels. Since the stream modes of FIG. 3 are closely based on the existing stream modes for DVDs, shown in Table 1, it will be apparent that such optical recording disks are basically compatible with existing types of DVD playback apparatus. Compatibility can be achieved in the case of recorded L and R-channel audio signals, for example, by slightly modifying the program of the system controller of an existing DVD decoder apparatus such that the system will recognize when a stream mode in accordance with Table 3 is indicated by the discrimination data in the ADI sections of data packets, and will then extract and decode the PCM audio data from successive audio packets of the playback data obtained from such an optical recording disk.

Similarly, it will be clear that existing audio reproduction for use with CDs could readily be modified to handle optical recording disks according to the present invention having audio signals recorded with a PCM sampling frequency of 44.1 kHz.

Thus, such a type of optical recording disk provides a substantial degree of compatibility with existing DVD and CD reproduction equipment, while enabling future types of DVD apparatus to provide the very high fidelity of audio reproduction that is possible with the single bit stream data encoding method.

BRIEF DESCRIPTION OF THE DRAWINGS

FIG. 22 is a diagram illustrating the configuration of an audio pack which is in accordance with the DVD standards;

FIG. 23 illustrates the respective configurations of a DSI pack and a VBI pack, which are in accordance with the DVD standards;

FIGS. 24A, 24B, 24C are respective block system diagrams of examples of prior art systems for digital encoding of audio signals for recording/playback processing, while

FIG. 25 includes Table 1 showing 8 stream modes specified for audio packets in PCM form by the originally established DVD standards;

FIG. 26 includes Table 2 which shows the proposed new standards for 8 stream modes; and FIG. 27 shows Table 3 which proposes standards for a new stream mode, for 10-channel data transfer by DVD audio packets in accordance with the embodiments of the present invention.

DESCRIPTION OF PREFERRED EMBODIMENTS

Figure 1:
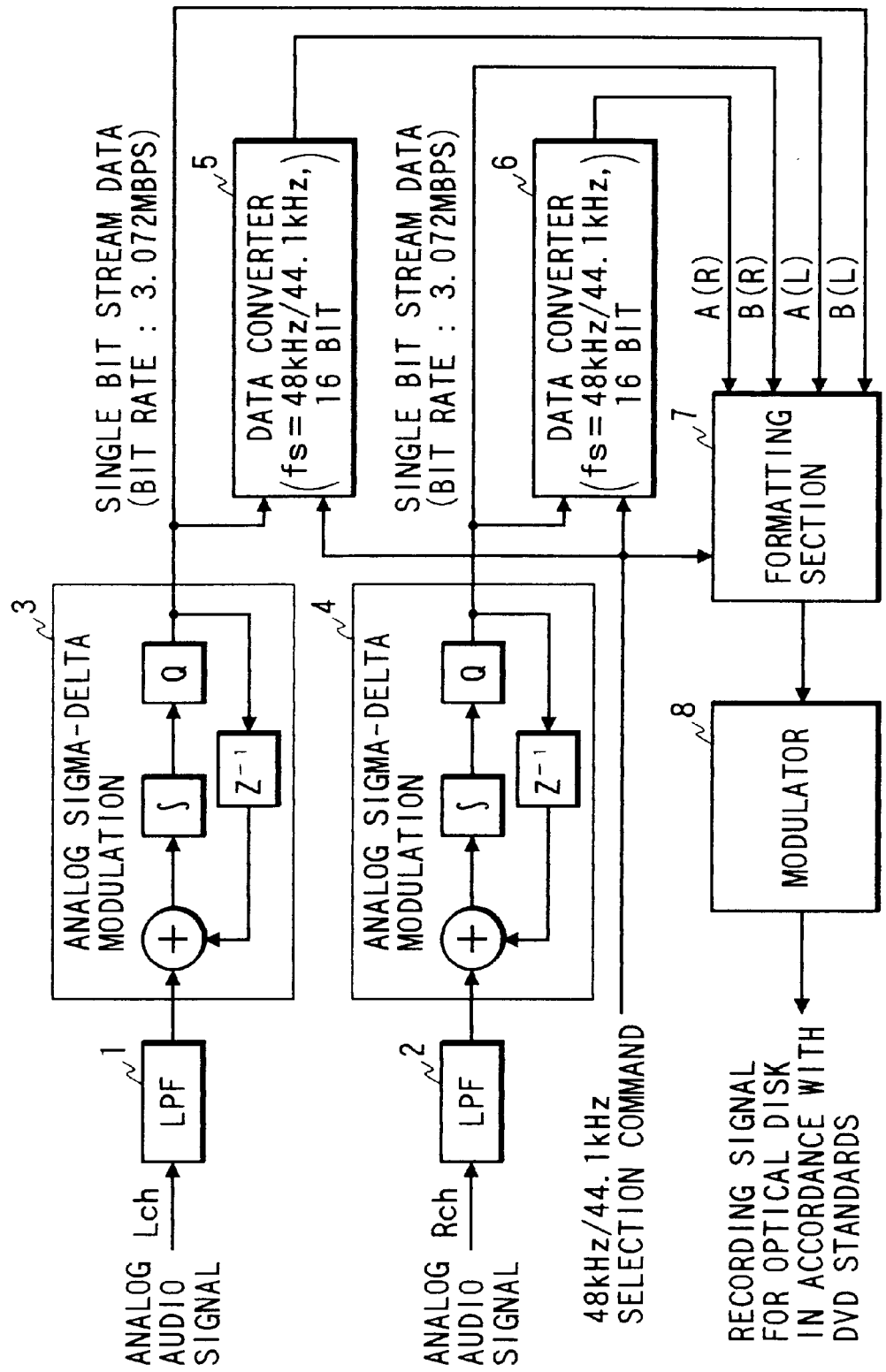
FIG. 1 is a circuit block diagram of a first embodiment of an encoder apparatus for generating a recording signal for an audio optical recording disk according to the present invention.

FIG. 1 is a system block diagram of a first embodiment of an encoder apparatus for recording L and R-channel analog audio signals as digital data on an optical recording disk according to the present invention. In FIG. 1, numerals 1 and 2 denote respective LPFs (low-pass filters) and 3 and 4 denote respective analog sigma-delta modulators, each formed of an adder, an analog integrator, a 1-bit quantizer, and a 1-clock period delay unit. Numerals 5 and 6 denote respective data converters for converting single bit stream data to PCM data. A formatting section 7 generates successive formatted audio packets, each basically being of the form shown in FIG. 22, but with both PCM data and single bit stream data being recorded in the audio data portion of each packet, i.e. data of the four input data streams which are supplied to the formatting section 7 from the data converters 5, 6 and the sigma-delta modulators 3, 4. A modulator 8 serves to modulate a recording signal in accordance with DVD standards, to record the successive audio packets.

In the following, for brevity of description, only the processing applied to the L-channel analog audio signal will be described in detail, since identical processing is applied to the R-channel signal. Firstly, the input L-channel analog audio signal is supplied to the LPF 1 to be limited in bandwidth, and the resultant signal is supplied to the analog sigma-delta modulator 3. 1-bit quantization by sigma-delta modulation is applied to that analog audio signal by the analog sigma-delta modulator 3, to obtain a resultant encoded digital signal, i.e. a flow of single bit stream data denoted as B(L) in FIG. 1, at a bit rate of 3.072 Mbps. Although this is a digital signal, it retains the frequency spectrum of the analog audio signal supplied from the LPF 1.

The single bit stream data from the analog sigma-delta modulator 3 are input to the data converter 5, and are also supplied to one input of the formatting section 7. It will first be assumed that with this embodiment, the data converter 5 converts the single bit stream data to PCM data at a PCM sampling frequency of 48 kHz, with 16 bits/sample. The resultant stream of PCM data, denoted as A(L) in FIG. 1, is applied to a second input of the formatting section 7. Thus the formatting section 7 receives a total of four input digital signals, i.e. two single bit stream data signals each at a bit rate of 3.072 mpbs, respectively conveying the L and R-channel analog audio signals, and two PCM data signals which also respectively convey the L and R-channel analog audio signals, each having a sampling frequency of 48 kHz with 16 bits/sample.

Figure 2:
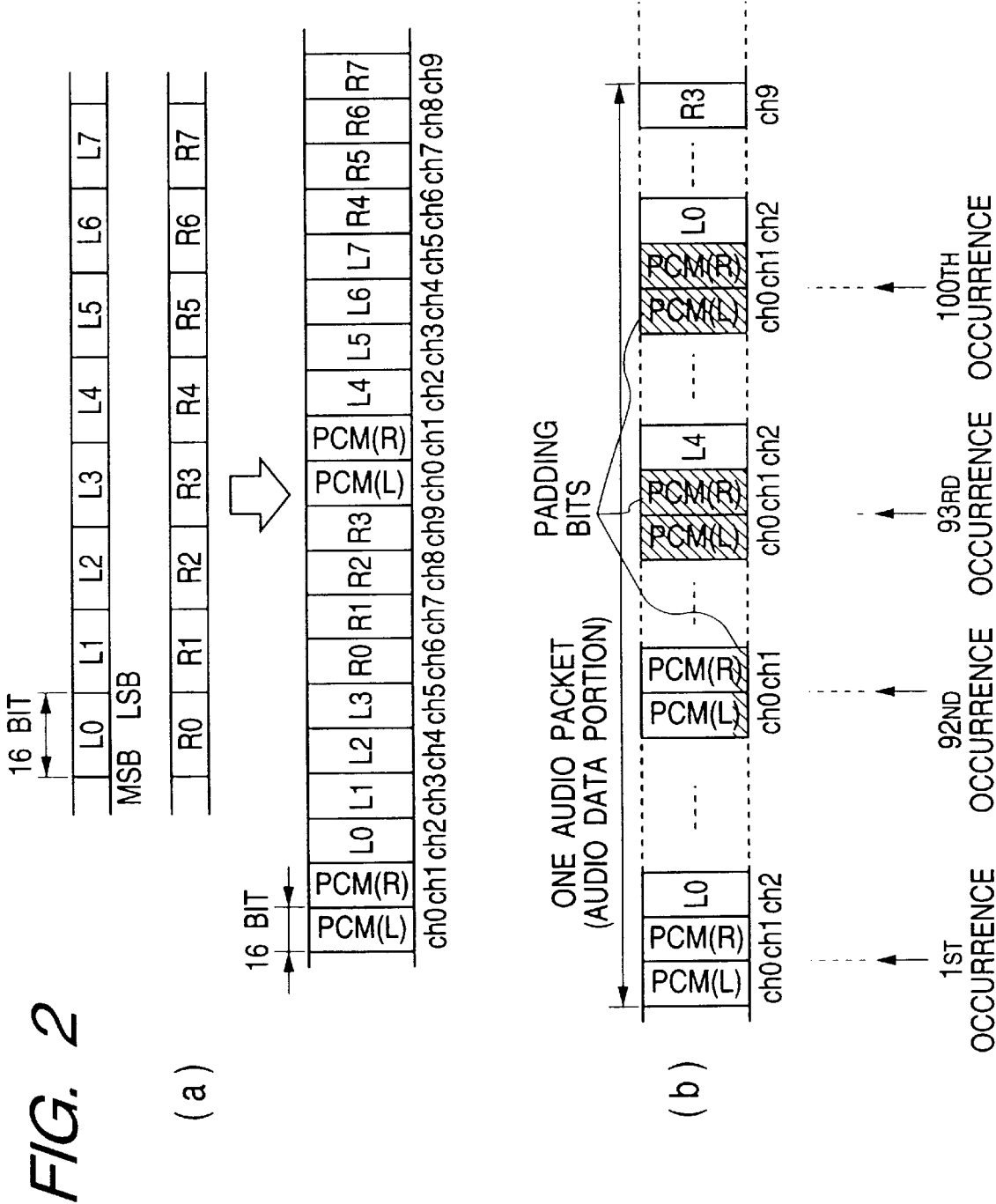
FIG. 2 illustrates the manner of allocating PCM data and single bit stream data to respective channels of a data stream which is conveyed by audio packets, and the manner of inserting padding bits into PCM data which have been recorded at a sampling frequency of 44.1 KHz.

The operation of the formatting section 7 in that case is based on the first of the two stream modes shown in Table 3, i.e. which specifies a PCM data sampling frequency of 48 kHz, with 16 bits/sample. As described above, each of these stream modes provides 10 data channels, and the present invention proposes to add these stream modes to the stream modes which are currently specified by the DVD standards. For ease of description, the stream modes of Table 3 will be referred to in the following as the supplemental stream modes. With such a supplementary stream mode, two of the 10 data channels (designated as ch0 and ch1 in FIG. 2) are assigned to the PCM data, e.g. with the PCM data being conveyed as successive 16-bit samples by the first two data channels respectively (i.e. the PCM data are conveyed as successive sets of 32 bits, in respective audio packets), while the single bit stream data are conveyed by the remaining 8 data channels (i.e. the single bit stream data are conveyed as successive sets of 128 bits, in respective audio packets). The manner of allocating the single bit stream data to these 8 data channels is illustrated in FIG. 2. As shown, successive sets of 16 consecutive bits of the single bit stream data, designated as L0, L1, L2, etc. in the upper part of diagram (a) of FIG. 2, are assigned to respective ones of the 8 data channels, which are designated as ch2, ch3, . . . ch9 in the lower part of diagram (a) of FIG. 2.

The rate of generating the PCM data which are supplied to the formatting section 7 is 1.536 Mbps, i.e. 2 (L and R audio channels)×16 (bits/sample)×48 kHz (sampling frequency). The rate of generating the single bit stream data which are supplied to the formatting section 7 is 6.144 Mbps, i.e. 2 (L and R audio channels)×3.072 Mbps. The ratio of these two bit generation rates, i.e. 1.536:6.144 is exactly equal to the ratio 2:8. It can thus be understood that by assigning respective transmission channel capacities to the PCM data and the single bit stream data which are in the ratio 2:8 as shown in FIG. 2, the time-axis relationship between the pair of audio signals encoded as the PCM data and the signals encoded as the single bit stream data can be maintained constant, throughout a data transmission/reception or recording/reproduction process.

The formatting section 7 forms the audio data portions of successive audio packets by assigning the PCM data and single bit stream data in the above manner, i.e. to thereby form each audio data portion as 2000 bytes, as specified in Table 3. In addition the formatting section 7, when generating the ADI (Audio Data Information) portion of each audio packet, inserts specific data into the ADI for indicating that the audio packet (and hence the optical recording disk) contains audio data encoded in accordance with a supplementary stream mode, i.e. one of the two stream modes shown in Table 3. The optical recording disk can thereby be distinguished from a standard type of DVD, by a decoding apparatus when the optical recording disk is played. Such specific data for indicating use of a supplementary stream mode will be referred to in the following as the discrimination data.

A suitable internal configuration of the formatting section 7 can be easily envisaged by a skilled individual, since methods of executing the basic operations required (i.e. time-axis compression applied to the respective input data streams, by appropriate memory read/write operations, and selective combining of the compressed data by multiplexing, in accordance with the data channel arrangement shown in FIG. 2, to form respective audio data portions of successive audio packets) are well known. For that reason, detailed description will be omitted.

The audio packets thus generated successively by the formatting section 7, after attachment of pack headers to form respective data packs, are supplied to the modulator 8, which modulates a recording signal with these data packs, in accordance with DVD standards, and the data are then recorded on an optical recording disk.

It can thus be understood from the above that with an optical recording disk according to the present invention, audio data are recorded as a sequence of audio packets, with the encoded data arranged within each audio packet in the manner shown in the lower part of diagram (a) of FIG. 2. The information contents conveyed by the encoded data, e.g. a musical item, are thereby encoded in two basically different ways, i.e. as PCM data and as single bit stream data.

In the above, it has been assumed that the first of the supplementary stream modes shown in Table 3 is utilized, i.e. having 10 data channels, and with the PCM data having a sampling frequency of 48 kHz and 16 bits per sample. However it would be equally possible to use the second stream mode of Table 3, i.e. having 10 data channels, a PCM sampling frequency of 48 kHz, but 20 bps. In that case, each of the analog sigma-delta modulators 3 and 4 will be configured to execute quantization at a rate of 3.840 Mbps, while each of the data converters 5 and 6 will be configured to convert the corresponding flow of single bit stream data to PCM data having a sampling frequency of 48 kHz and 20 bits per sample. The operation would then be substantially the same as that described above for the case of 16 bits per sample, however in FIG. 2, each of the values indicated as 16 bits would of course be changed to 20 bits, and each of the data channels ch0 to ch9 would convey sets of 20 bits rather than sets of 16 bits.

With such an arrangement, the overall rate at which the PCM data are generated (by the data converters 5 and 6 together) would be 1.920 Mbps, i.e. 2 (audio channels)×20 (bits)×48 kHz, while the overall rate at which the single bit stream data are generated would be 7.680 Mbps, i.e. 2 (audio channels)×3.840 Mbps. Hence, the ratio of the respective rates of generation of the PCM data and single bit stream data will again be exactly equal to 2:8. Hence, in the same way as described above for the case of 16 bps, satisfactory operation is ensured by allocating two of the 10 data channels of the supplementary stream mode to the PCM data, and allocating the remaining 8 data channels to the single bit stream data.

A second embodiment of an encoder apparatus according to the present invention will now be described, for recording encoded audio data on an optical recording disk according to the present invention with the PCM data having a sampling frequency of 44.1 kHz rather than 48 kHz. The configuration and operation of this second embodiment are respectively substantially identical to those of the first encoder apparatus embodiment described above and shown in FIG. 1, so that this embodiment will be assumed to be implemented as a second mode of operation of the encoder apparatus shown in FIG. 1, i.e. that the operation of each of the data converters 5 and 6 and of the formatting section 7 can be modified by externally supplied selection command signals which designate either a 48 kHz or a 44.1 kHz mode of operation. That is to say, the second mode of operation of the encoder apparatus is established by supplying such a selection command signal to the data converters 5, 6 and the formatting section 7, designating the 44.1 kHz mode. Operation with a 16 bits per sample PCM data will first be assumed. In that case, each of the delta-sigma modulators 3, 4 continues to generate single bit stream data at the 3.072 Mbps rate, in the same way as for the 48 kHz PCM sampling frequency. However each of the data converters 5 and 6 generates PCM data with a sampling frequency of 44.1 kHz.

As noted above, when the PCM sampling frequency is 48 kHz and each of the single bit stream data signals are generated at 3.072 Mbps, use of the data channel allocation arrangement shown in FIG. 2 makes it possible to exactly match the ratio of the rates at which the PCM data and single bit stream data are supplied to a formatting section (to be inserted into data channels) to the ratio of the respective channel data-transmission capacities assigned to them. However with a PCM sampling frequency of 44.1 kHz, this is no longer true, i.e. the rate of generation of PCM data becomes reduced by a factor 44.1/48 by comparison with use of the 48 kHz sampling frequency. Assuming the 2000 bytes of audio data are conveyed by each audio packet, as specified for the stream modes in Table 3, this amounts to a reduction of 32.5 bytes per audio packet, i.e. 2000 (bytes)× ($^2$/$_{10}$)×{1−(44.1/48)}. For that reason, it is necessary to insert 32.5 padding bytes (i.e. 260 bits) into each audio packet. This is done as follows. Since the total number of PCM data bytes in each audio packet should be 400 (i.e. with the aforementioned ratio of 2:8 for the PCM data and single bit stream data), there will be 100 occurrences of the ch0 bits and ch1 bits in each audio packet, with each occurrence containing 4 bytes. Thus, compensation can be performed by maintaining the total number of PCM data bytes in each audio packet as 400, setting each of the final pair of bits of the 92-nd occurrence of the ch0 bits and the ch1 bits within the audio data portion of each audio packet to the "0" state, and setting all of the bits in the 93-rd and subsequent occurrences of the ch0 bits and ch1 bits to "0". Satisfactory operation will then be achieved, if it is ensured that a decoder apparatus will not recognize any string of "0" bits as constituting encoded audio data, when decoding an optical recording disk according to the present invention having such 44.1 kHz sampling frequency PCM data recorded thereon.

The insertion of padding bits as described above is illustrated conceptually in diagram (b) of FIG. 2.

Various other arrangements for inserting such padding bits other than by using "0" state bits could be envisaged, so long as it is made possible for a decoder apparatus to select only the appropriate bytes of each of the ch0 and ch1 PCM data of each audio packet, when playing such a 44.1 kHz encoded disk.

In addition, when the encoder apparatus operates in this 44.1 kHz sampling frequency mode, the formatting section 7 adds, to the discrimination data inserted in the ADI portion of each audio packet, data indicating that the PCM data of the audio packet were generated with a sampling frequency of 44.1 kHz.

The modulator 8 generates a recording signal modulated with the stream of audio packets produced from the formatting section 7 (more precisely, with data packs respectively containing these audio packets), in accordance with the DVD standards, in the same way as described previously.

It can thus be understood that the present invention further makes it possible to provide optical recording disks which can be played on a DVD playing apparatus, to provide audio PCM data that can be directly supplied to existing audio reproduction equipment which is designed for use with conventional CDs.

Figure 3:
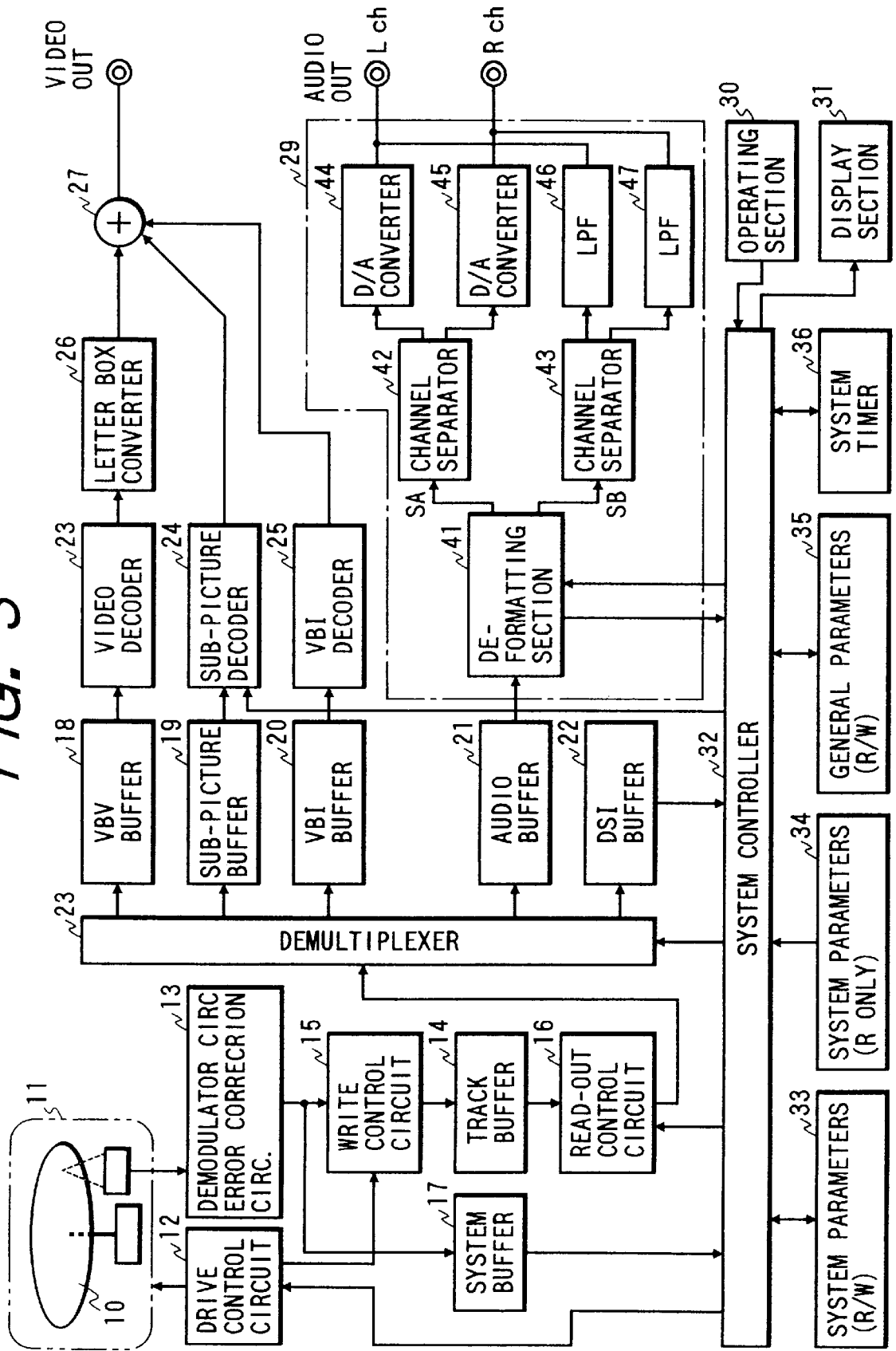
FIG. 3 is a system block diagram of a DVD playback system which incorporates an embodiment of a decoder apparatus according to the present invention.

In the above description of operation of the encoder apparatus of FIG. 1 in the 44.1 kHz sampling frequency mode, it has been assumed that the first of the supplementary stream modes shown in FIG. 3 is used, i.e. with 10 data channels, 48 kHz PCM sampling frequency, and 16 bits per sample. However it would be equally possible to configure the encoder apparatus to utilize the second stream mode of FIG. 3, i.e. with 20 bits per sample, and to operate in either a 48 kHz or a 44.1 kHz sampling frequency mode, in the same way as has been described for 16 bits per sample operation. In that case it is only necessary to ensure, for operation in the 44.1 kHz sampling frequency mode, that an appropriate number of padding bits are recorded in each audio packet, to compensate for the (44.1/48) reduction factor in the rate of generation of PCM data by comparison with the 48 kHz sampling frequency mode.

An embodiment of a decoder apparatus for optical recording disks according to the present invention will be described in the following. It will be assumed that the decoder apparatus is incorporated into a DVD playback system, as shown in the system block diagram of FIG. 3, i.e. to provide a playback system which is capable of playing both conventional DVDs (having data packs recorded in accordance with a stream mode of Table 1 or Table 2) and audio optical recording disks according to the present invention. However only the functions concerned with playing an audio optical recording disk according to the present invention will be described in detail the following. In FIG. 3, 11 denotes a readout section, which reads data which are recorded on a audio optical recording disk 10, as a playback signal. 12 denotes a drive control circuit, for controlling the readout section 11, 13 denotes a demodulator and error correction circuit, 14 denotes a track buffer for temporarily storing track data read from the disk 10, 15 is a write control circuit for controlling write-in of data to the track buffer 14, 17 is a system buffer for temporarily storing various types of control data which are contained in the data stream read out by the readout section 11, 18 denotes a VBV buffer, 19 denotes a sub-picture buffer, 20 denotes a VBI buffer, 21 denotes an audio buffer, and 22 denotes a DSI buffer. 23 denotes a multiplexer, for distributing to the respective buffers 18 to 22, data which are read out from the track buffer 14 via the read control circuit 16. 23 denotes a video decoder, for decoding video data read out from the VBV buffer, 24 is a sub-picture decoder for decoding sub-picture data which are read out from the sub-picture buffer 19, and 25 is a VBI decoder for decoding VBI data which are read out from the VBI buffer. 26 denotes a letter box converter, for converting decoded video data, and 27 is an adder, for obtaining a video output signal by adding together the decoded video data, sub-picture data, and VBI data.

Numeral 29 denotes an audio decoder, for decoding audio data which are read out from the audio buffer 21, 30 denotes an operating section through which a user of the playback system can input control commands, 31 denotes a display section, 32 denotes a system controller which controls the overall operation of the system, 33 to 35 are respective parameter registers which hold various parameters that are used by the system controller 32, and 36 denotes the system timer.

In the case of playing a conventional type of DVD disk (i.e. as detected by the system controller 32, based on the contents of the header portions of the data packs constituting the playback signal), having both video and audio data recorded thereon, the playback system of FIG. 3 recovers and outputs a video playback signal and two channels (R, L) of audio playback signals, from the playback signal that is read from the optical recording disk 10. Since that type of playback operation is known in the art, further description will be omitted. In that case, a command sent from the system controller 32 causes the audio decoder 29 to function in an operating mode whereby it decodes the audio PCM data (extracted from DVD data packs) which are supplied from the audio buffer 21, to thereby obtain two L and R analog audio signals as the output signals from the audio decoder 29.

The audio decoder 29 is however configured to be also capable of recovering the aforementioned PCM data and single bit stream data of an audio optical recording disk according to the present invention, and it will be assumed that the system controller 32 of the playback system of FIG. 3 is programmed to detect (i.e. from the aforementioned discrimination data of the ADI sections of the audio packets, contained in data supplied from the DSI buffer 22) when the optical recording disk 10 is an audio optical recording disk according to the present invention. In that case, the system controller 32 supplies a command to a deformatting section section 41 of the audio decoder 29 whereby the operation described in the following is executed. Typically, the operation of the deformatting section 41 will be determined by a control program of a local CPU, and commands sent from the system controller 32 to the deformatting section 41 will specify use of respectively different control programs by the deformatting section 41, in accordance with different modes of operation of the audio decoder 29.

The audio decoder 29 includes the above-mentioned deformatting section 41, which receives encoded audio data supplied thereto from the audio buffer 21, i.e. data which have been extracted from the audio data portions of successive audio packets of the playback signal, and set into the audio buffer 21. The deformatting section 41 analyzes the audio data, to separate this into two output data streams designated as SA and SB in FIG. 3, respectively consisting of the PCM data and the single bit stream data conveyed by the audio packets. Only one of these streams of data SA or SB is selected to be produced from the deformatting section 41, with that selection being determined by the user as described hereinafter. The audio decoder 29 further includes a channel separator 42 which receives the PCM data stream SA, and separates this into a stream of PCM data corresponding to the L-channel audio signal, which is supplied to a D/A converter 44, and a stream of PCM data corresponding 'to the R-channel audio signal, which is supplied to a D/A converter 45. Decoded L-channel and R-channel analog audio signals are thereby produced by the D/A converters 44 and 45 respectively.

The data stream SB is supplied to a channel separator 43, which separates this into a stream of single bit stream data corresponding to the L-channel audio signal, which is supplied to a lpf 46, and a stream of single bit stream data corresponding to the R-channel audio signal, which is supplied to a lpf 47. Decoded L-channel and R-channel analog audio signals, having a substantially improved fidelity of reproduction by comparison with the analog audio signals reproduced from PCM data, as described hereinabove, are thereby produced by the lpfs 46, 47 respectively.

It will be assumed that with the decoder apparatus embodiment of FIG. 3, a user of the apparatus must select beforehand, by inputting a command to the operating section 30, the type of digital data from which analog audio signals will be derived when an audio optical recording disk according to the present invention is to be played, i.e. the user must specify whether the R and L-channel analog audio signals are to be derived from the single bit stream data or from the PCM data. The system controller 32 then sends a corresponding command to the deformatting section 41, specifying whether the PCM data SA or the single bit stream data SB are to be output from the deformatting section 41, i.e. specifying either a PCM playback mode or a single bit'stream playback mode of operation for the audio decoder 29.

Figure 4:
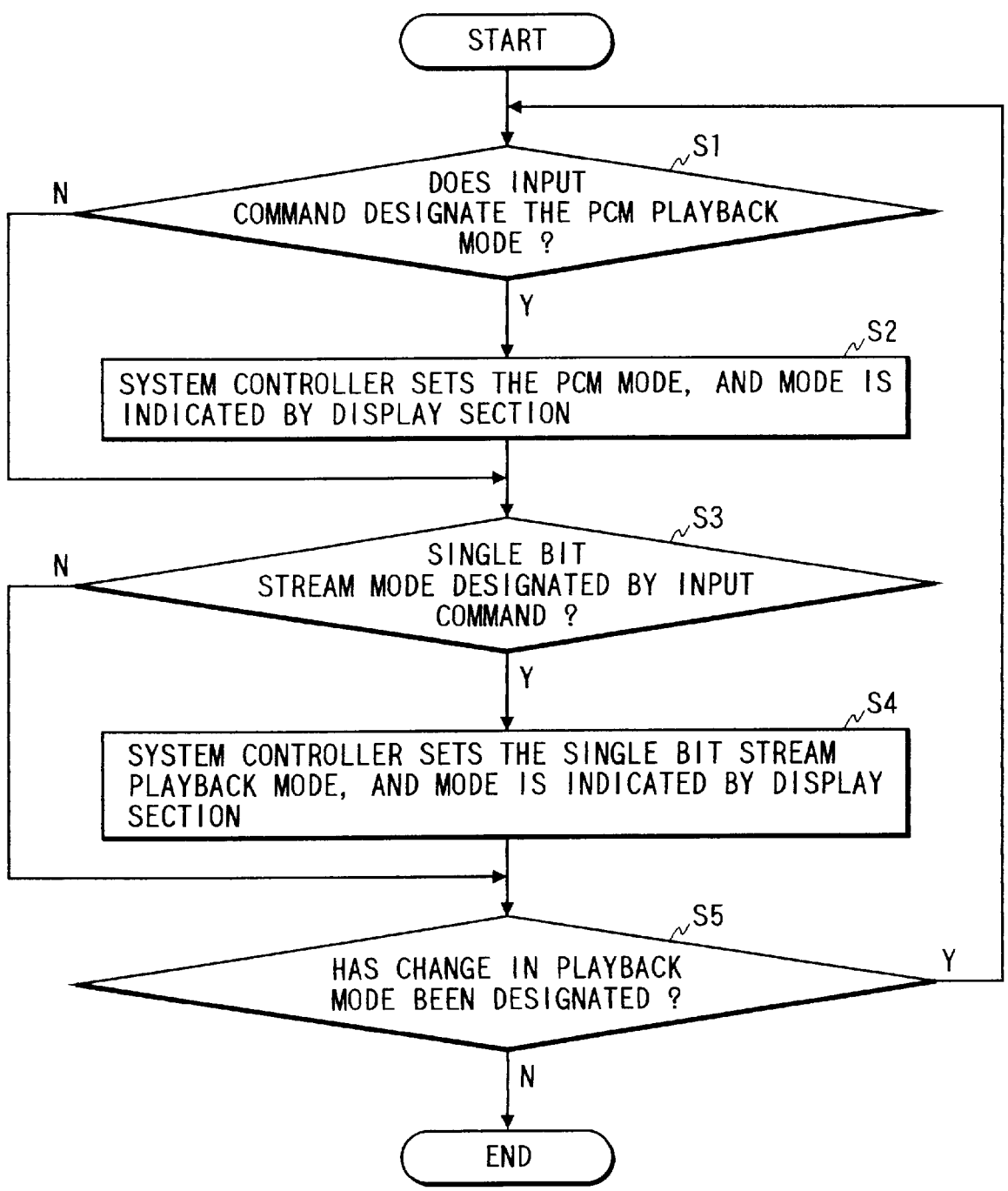
FIG. 4 is a flow chart of processing whereby either a PCM playback mode or a single bit stream playback mode is selected for the decoder apparatus embodiment of FIG. 3.

The operation sequence for determining such a playback mode for the audio decoder 29 is shown in the flow diagram of FIG. 4. In that flow diagram, in step S1, the system controller judges whether the user has specified the PCM playback mode, and if so, as shown in step S2, the system controller 32 sets an operating program for the deformatting section 41 whereby the PCM playback mode is established, and causes the display section 31 go produce a visible indication that the PCM playback mode is established. Alternatively, if the single bit stream playback mode has been specified, then steps S3, S4 are executed, to establish and indicate the single bit stream playback mode.

Figure 5:
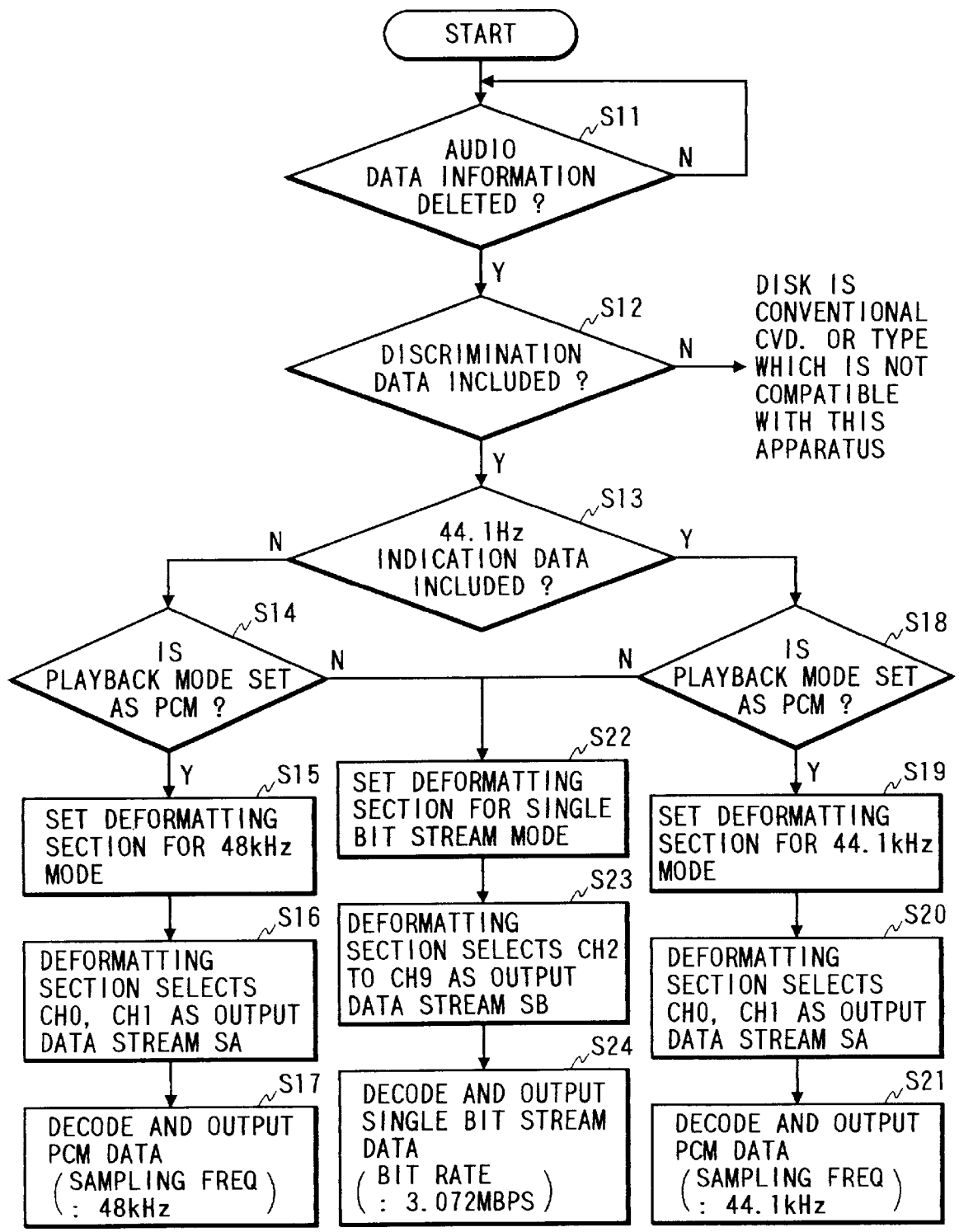
FIG. 5 is a flow chart of respective operating sequences which are executed for decoding playback data from an audio optical recording disk according to the present invention, in accordance with the playback mode which is selected by the processing of FIG. 4.

The basic operation of the encoder apparatus will be described referring to the operation sequence shown in the flow diagram of FIG. 5. Firstly, when a "disk play" command is input from the operating section 30, reading of data from the disk 10 is started, the system controller 32 receives resultant pack header data from the DSI buffer 22, and thereby judges whether each pack contains audio data (step S11). If so, step S12 is executed to judge whether the ADI section of the audio packets contain the aforementioned discrimination data, which indicate that the disk 10 is an audio optical recording disk according to the present invention. If no discrimination data is found, then this signifies that the disk 10 is a conventional DVD disk (i.e. whose contents include PCM-encoded audio data), or a disk which cannot be played by this playback system, in which case respectively appropriate processing is performed (e.g. halting of the playing operation, and displaying a message to the user, by the display section 31). However if the discrimination data are detected, then step S13 is executed, in which the contents of the discrimination data are judged to determine:

(a) whether the recorded PCM data were generated using the aforementioned 48 kHz sampling frequency mode, or the 44.1 kHz sampling frequency mode, and (b) whether the audio data were recorded using the first or the second of the supplementary stream modes shown in Table 3.

If the discrimination data contents indicate that the 48 kHz sampling frequency has been used when recording the PCM data, i.e. the deformatting section 41 is to operate in a 48 kHz format analysis mode, then steps S14 to S17 are executed. In step S14 a decision is made as to whether the user has specified the PCM playback mode, for audio data reproduction. If so, step S15, S16 are executed to perform format analysis in the 48 kHz mode, extract the contents of only the ch0 and ch1 data channels in each audio packet, and output these as the SA data stream from the deformatting section 41 (i.e. with either 16 bits per sample or 20 bits per sample, depending upon the stream mode which has been found from the packet ADI). The PCM data are then decoded by being separated into the L-channel and R-channel data streams, each at the 48 kHz sampling frequency, by the channel separator 42, and converted by the D/A converters 44, 45, to obtain the L and R-channel analog audio signals as described above. Specifically, the channel separator 42 selects the ch0 data channel contents of each audio packet to constitute the stream of PCM data (at a sampling frequency of 48 kHz, with 16 bits per sample) which are supplied to the L-channel D/A converter 44, and selects the ch1 data channel contents of each audio packet to constitute the PCM data which are supplied to the R-channel D/A converter 45.

If on the other hand it is found in step S13 that the discrimination data in the packet ADI indicates that the 44.1 kHz sampling frequency has been used when recording the PCM data, i.e. the deformatting section 41 is to operate in a 44.1 kHz format analysis mode, and that the user has specified the PCM playback mode be used for audio data reproduction, then steps S18 to S21 are executed. In that case, the operation is similar to that described for steps S14 to S17, but with the aforementioned "O" state padding bits in each audio packet being absent from the deformatted PCM data that are obtained, as described above.

If it is found in either of steps S14 or S18 that the user has selected the single bit stream playback mode to be used for audio data reproduction, then steps S22 to S24 are executed. In that case, the operation is independent of the discrimination data of the pack ADI. In step S22, the deformatting section 41 is set to operate in a single bit stream format analysis mode, by a command from the system controller 32, and thereafter selects only the contents of the ch2 to ch9 data channels in each audio packet, and outputs these as the SB flow of single bit stream data, which is then separated into two streams of L and R-channel single bit stream data by the channel separator 43, which are supplied to the lpfs 46, 47 to obtain the L and R-channel analog audio signals (steps S23, 24). Specifically, referring to FIG. 2, the channel separator 43 selects the contents of the ch2 to ch5 data channels of each audio packet to constitute the single bit stream data (at a bit rate of 3.072 MHz) which are supplied to the L-channel lpf 446, and selects the contents of the ch6 to ch9 data channels of each audio packet to constitue the flow of single bit stream data that are supplied to the R-channel lpf 47.

It can thus be understood that with this embodiment of a decoder apparatus according to the present invention, a user can select a playback mode for an audio optical recording disk according to the present invention such that either the PCM data or the single bit stream data are decoded to obtain the output analog audio signals.

The decoder apparatus of FIG. 3 has been assumed to be incorporated within a DVD playback apparatus which has been configured to be capable of decoding audio signals which are encoded as PCM data and and also signals which are encoded as single bit stream data. However it will be apparent from the above description that it would be equally possible to play an audio optical recording disk according to the present invention by using a DVD playback apparatus which is capable only of decoding audio signals which are encoded as PCM data, since such a audio optical recording disk has audio signals recorded both as PCM data and as single bit stream data. That is to say, an existing type of DVD playback apparatus could easily be made capable of playing such audio optical recording disks, by making a simple modification to the operation of the system controller, such that the controller is programed to recognize the aforementioned discrimination data of the pack ADI. Similarly, it would be possible to play an audio optical recording disk according to the present invention on a playback apparatus which is capable only of decoding single bit stream data.

An audio optical recording disk according to the present invention is capable not only of recording L and R-channel (i.e. stereophonic) audio signals, but also of recording various other types of multi-channel audio systems. In each case, the multi-channel audio signals are recorded both as PCM data and also as single bit stream data, using one of the stream modes shown in Table 3, i.e. with 10 data channels, a PCM sampling frequency of 48 kHz, and 16 or 20 bits per sample. Designating the number of channels of such multi-channel audio signals as N, the N audio channels are first encoded by using a technique which is specific to that multi-channel audio system, to obtain a single combined audio channel, or a pair of combined audio channels. Each combined audio channel is then encoded as PCM data, which are recorded in the first two data channels (ch0, ch1) of each audio packet, in the same way as described for the L and R-channel audio signals of the previous embodiments. In addition, the N audio channels are encoded into respective flows of single bit stream data at a bit rate of 3.072 or 3.840 Mbps (in accordance with whether the PCM bits per sample is 16 or 20) by sigma-delta modulation, the single bit stream data are subjected to bandwidth compression by a factor (2/N), and are then recorded in the remaining 8 data channels (ch2 to ch9) of the aforementioned 10 data channels of each audio packet. In addition, the discrimination data (which is added to the ADI portion of each audio packet as described hereinabove for the case of 2-channel audio signal recording) has inserted therein information which specifies the type of N-channel multi-channel audio system of the recorded data, in addition to the information which specifies the stream mode by which the audio data have been formatted.

With such an audio optical recording disk, since the ratio of the data channel capacities assigned to the PCM data and single bit stream data is again 2:8, and the ratio of the respective rates of generating the PCM data and single bit stream data is 1.536 Mbps:6.144 Mbps, or 1.920 Mbps:7.680 Mbps, the correct time-axis relationship can be established between the PCM data and single bit stream data which are conveyed by a stream of audio packets.

In the following, application of the audio optical recording disk of the present invention to four representative types of multi-channel audio systems will be described, i.e. the Dolby Surround system, the Dolby-AC-3 system, the DTS system, and the SDDS system. However it will be apparent from the description that the invention is not limited to these four systems. In addition, respective embodiments of encoder apparatus and decoder apparatus according to the present invention for use with these four multi-channel audio system will be described, and these will make clear the data structure in which encoded audio data are recorded upon the corresponding audio optical recording disk.

"Dolby Surround" is a trade name of Dolby Laboratories Inc., U.S.A.

(1) Dolby Surround System

Figure 6:
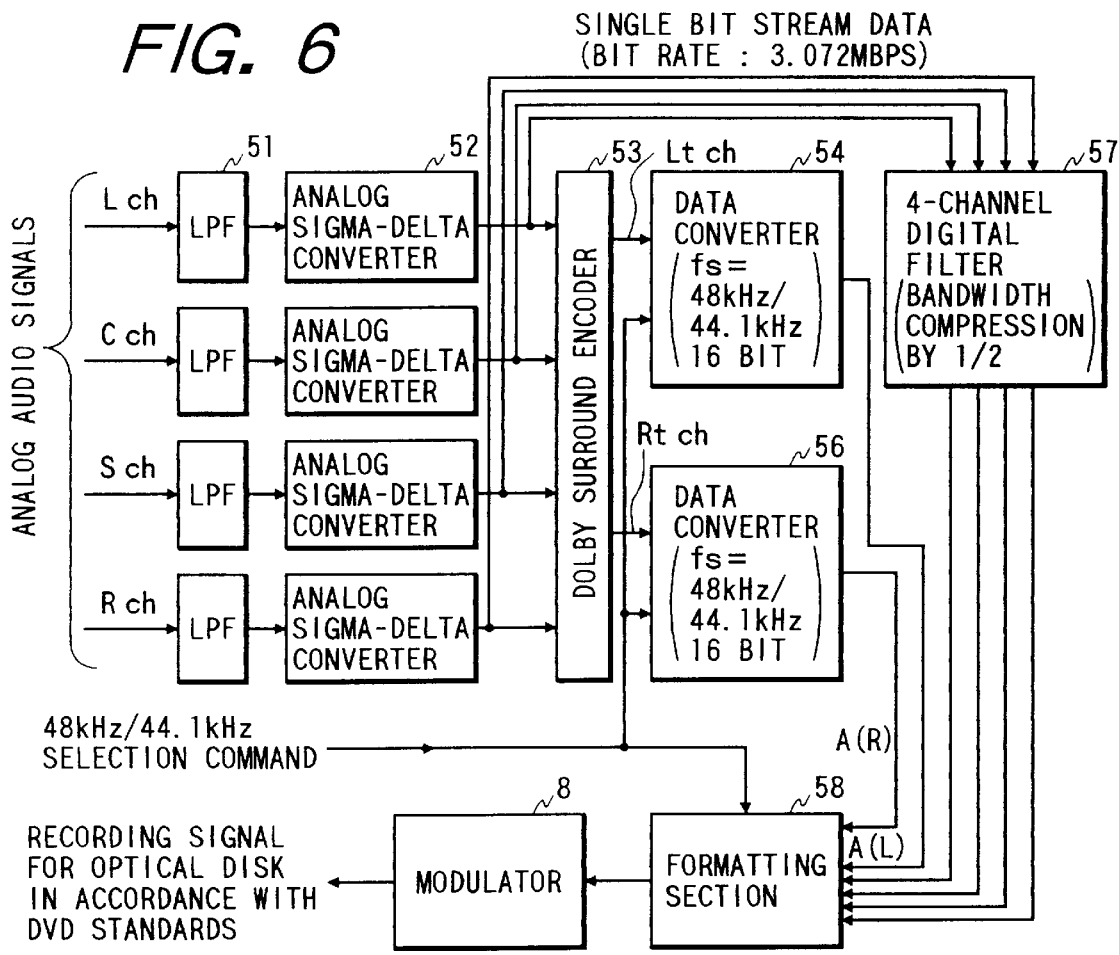
FIG. 6 is a circuit block diagram of a second embodiment of an encoder apparatus according to the present invention, for use with the Dolby Surround multi-channel audio system.

With the Dolby Surround multi-channel audio system, 3 front channels of analog audio signals (designated respectively as the L, C and R channels) and a single rear analog audio signal channel (designated as the S channel) are used, i.e. a total of 4 audio signal channels. FIG. 6 is a system block diagram of an embodiment of an encoder apparatus according to the present invention which is suitable for application to the the Dolby Surround system. The configuration and operation of this encoder apparatus are basically similar to those of the first encoder apparatus embodiment described above, shown in FIG. 1, so that only the points of difference from that of FIG. 1 will be described, as follows:

(a) Since there are 4 analog audio signals channels, a corresponding set of four LPFs 51 is provided, with the output signals from the LPFs being input to respective ones of a set of 4 sigma-delta modulators 52.

(b) The respective single bit stream data signals from the four sigma-delta modulators 52 are supplied to a Dolby Surround encoder 53, which encodes these by using the Dolby Surround encoding method, to obtain two streams of combined data which will be referred to as the Lt and Rt channels in the following.

(c) Before being supplied to the formatting section 58, each of the single bit stream data signals from the sigma-delta modulators 52 (at a bit rate of 3.072 Mbps) is subjected to bandwidth compression by a compression factor of ½, by a digital filter within a filter circuit 57.

(d) The formatting section 58 allocates the Lt and Rt data streams to the ch0 and ch1 data channels respectively of the stream of audio packets which are generated by the formatting section 58, and allocates the four compressed single bit stream data streams to the remaining 8 data channels (i.e. with each stream of single bit stream data being allocated to a corresponding pair of these 8 data channels). In addition the formatting section 58 adds, to the ADI portion of each audio packet, discrimination data which specifies that the audio data have been formatted using a supplementary stream mode (i.e. specifies one of the two stream modes shown in Table 3), and also specifies that the recorded data consist of encoded multi-channel audio signals which are in accordance with the Dolby Surround system.

Figure 7:
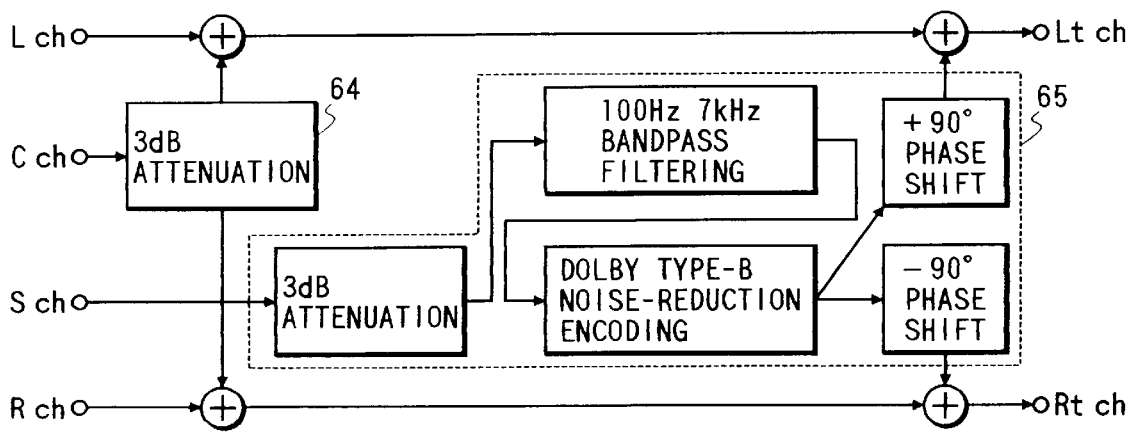
FIG. 7 is a functional block diagram of a Dolby Surround encoder for use in the encoder apparatus embodiment of FIG. 6.

FIG. 7 is a system block diagram of a suitable configuration for the Dolby Surround encoder 53 of FIG. 6. With this configuration, the multi-channel audio signal encoding processing which is usually executed by means of analog signal processing is performed by digital signal processing. Specifically, the C channel digital signal is attenuated by a a 3 dB attenuator, and the attenuated data are synchronously mixed with the L and R channel digital signals. The S channel digital signal is input to a processing circuit 65, in which it is attenuated by 3 dB, bandwidth-limited to the range 100 Hz to 7 kHz, then transferred through a Dolby type B noise reduction encoder, with the resultant processed digital signal being phase-advanced by 90° and mixed with the result of mixing the L channel and attenutated C channel digital signals, to thereby obtain the Lt channel output digital signal, and with the processed digital signal also being phase-retarded by 90° and mixed with the result of mixing the R channel and attenutated C channel digital signals, to thereby obtain the Rt channel output digital signal.

Data allocation is performed by the formatting section 58 such that the PCM data (with a bit rate of 1.536 Mbps, i.e.

2 channels×16 bits×48 kHz) is allocated to the first two channels (ch0, ch1) of the ten data channels, the single bit stream data after bandwidth compression by ½ (with a bit rate of 6.144 Mbps, i.e. 4 channels×3.072 Mbps×½) is allocated to the remaining 8 data channels (ch2 to ch9) of the 10 data channels of the supplementary stream mode. Thus, in the same way as described for the first embodiment, the ratio (2:8) of the data channel capacities allocated to the PCM data and the single bit stream data is made identical to the ratio of the bit rates at which the PCM data and the single bit stream data are supplied to the formatting section 58, thereby ensuring that these data can be conveyed by a stream of audio packets which are generated by the formatting section 58. The configuration and operation of a decoder apparatus corresponding to the above encoder apparatus for the Dolby Surround system can be substantially identical to those of the first decoder apparatus embodiment shown in FIG. 3 and described above. The only differences lie in the internal configuration and operation of the audio decoder 29.

Figure 8:
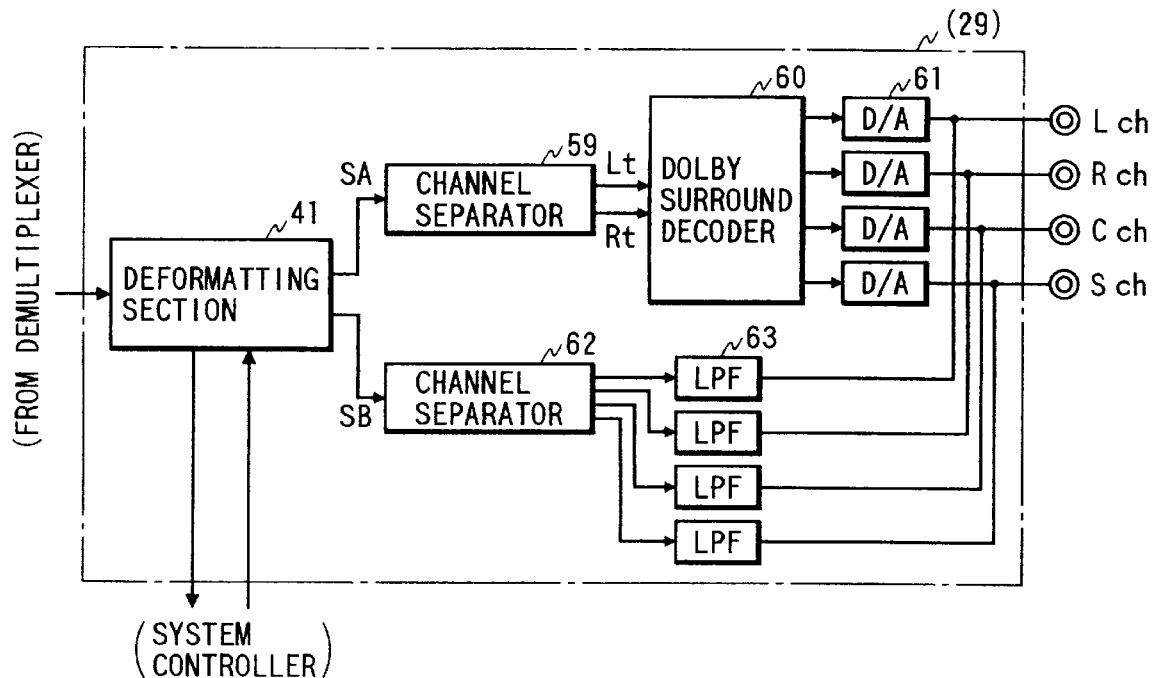
FIG. 8 is a circuit block diagram of a second embodiment of a decoder apparatus according to the present invention, for use with the Dolby Surround multi-channel iii audio system.

FIG. 8 is a system block diagram of an embodiment of a modified audio decoder 29 which is suitable for an audio decoder apparatus that is capable of playing audio optical recording disks according to the present invention that have been recorded using the Dolby Surround system. In the modified audio decoder 29 of FIG. 8, the deformatting section 41 separates the encoded audio data of the stream of audio packets, supplied from the multiplexer 23, into respective streams (SA, SB) of PCM data and single bit stream data, in the same way as described for the first embodiment, and supplies these to the channel separator 59 and to a channel separator 62, respectively. The channel separator 59 separates the ch0 and ch1 PCM data into the aforementioned Lt and Rt data streams, which are supplied to a Dolby Surround decoder 60. The Dolby Surround decoder 60 performs processing which is the inverse of that performed by the Dolby Surround encoder 53 of FIG. 6, to separate the Lt, Rt channels into four channels of PCM data, respectively corresponding to the L, R, C and S audio channels. These PCM data channels are supplied to respective ones of four D/A converters 61, to thereby recover the L, R, C and S-channel analog audio signals from the PCM data.

The single bit stream data SA from the deformatting section 41 is separated into four streams of single bit stream data, respectively corresponding to the L, R, C and S audio channels. These are supplied to respective ones of four LPFs 63, to thereby recover the L, R, C and S-channel analog audio signals from the single bit stream data.

Figure 9:
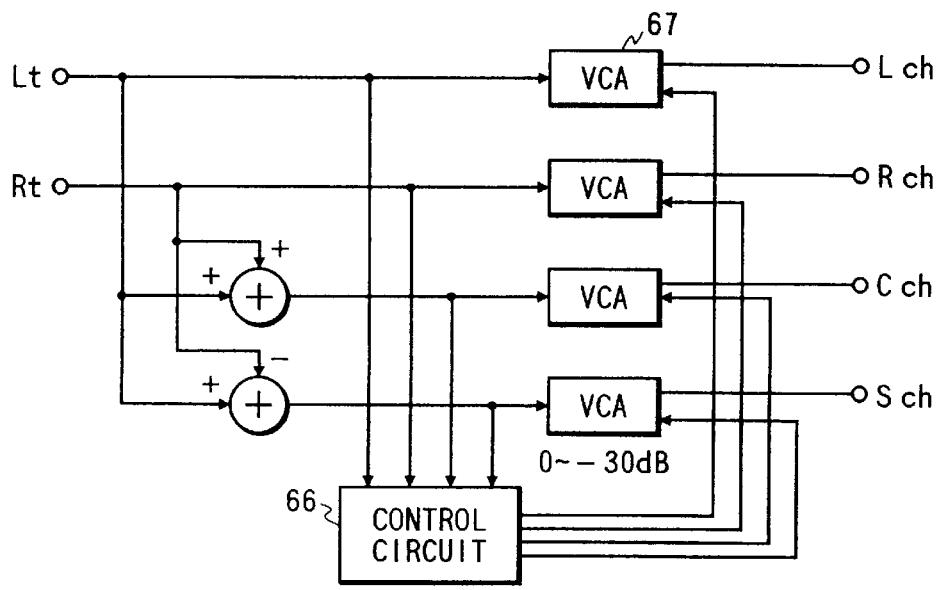
FIG. 9 is a functional block diagram of a Dolby Surround decoder for use in the decoder apparatus embodiment of FIG. 8.

FIG. 9 is a functional block diagram for illustrating the operation of the Dolby Surround decoder 60 of FIG. 8. Here again digital, rather than analog, signal processing is utilized. In FIG. 8, the Lt and Rt channel digital signals are supplied to a set of four VCAs (Voltage Control Amplifiers) 67, which respectively produce the four streams of PCM data corresponding to the L, R, C and S-channel audio signals. Specifically, the Lt and Rt digital signals are input directly to respective ones of a first two VCAs (to obtain input signals respectively corresponding to the L and R-channel audio signals), are summed (to obtain an input signal corresponding to the C-channel audio signal) and the resultant digital signal supplied to a third one of the VCAs, and are mutually subtracted (to obtain an input signal corresponding to the S-channel audio signal), with the resultant digital signal being supplied to a fourth one of the VCAs, as shown. Each of the VCAs 67 performs variable attenuation within the range 0 to −30 dB, under the control of respective control signals supplied thereto from a control circuit 66. The control circuit 66 generates these control signals by detecting the respective values of the Lt, Rt, (Lt+Rt) and (Lt−Rt) digital signals, to thereby control the VCAs 67 such as to compensate for the aforementioned type B noise-reduction encoding, and thereby obtain respective streams of PCM data corresponding to the L, R, S and S-channel analog audio signals.

The Dolby Surround encoder apparatus and decoder apparatus have been described above for the case in which the first of the supplementary stream modes shown in Table 3 is utilized (10 data channels, 48 kHz sampling frequency, 16 bits per sample). However it would be equally possible to use the other supplementary stream mode (i.e. 10 data channels, 48 kHz sampling frequency, 20 bits per sample). In that case, each of the analog sigma-delta modulators 52 would be configured to execute 1-bit quantization at a rate of 3.840 Mbps, and the data converter 54 configured to generate PCM data having 20 bits per sample, at the 48 kHz sampling frequency. Use of these values will ensure that identical results would be obtained to those obtained for using the first supplementary stream mode of Table 3.

In addition, the encoder apparatus and decoder apparatus of the Dolby Surround system described above can be utilized with the second type of audio optical recording disks according to the present invention, i.e. having PCM data which was generated at a sampling frequency of 44.1 kHz. As indicated in FIG. 6, each of the data converters 54, 56 and the formatting section 58 is controlled by a selection command input from the system controller 32. When that command designates the 44.1 kHz mode of operation, then the PCM data are generated at a sampling frequency of 44.1 kHz by the data converters 54, 56, and the requisite number of padding bits is inserted into each audio packet by the formatting section 58 to compensate for the (44.1/48) reduction in the rate of generating PCM data, in the same manner as described for the preceding encoder apparatus embodiment.

(2) Dolby-AC-3 System

Figure 10:
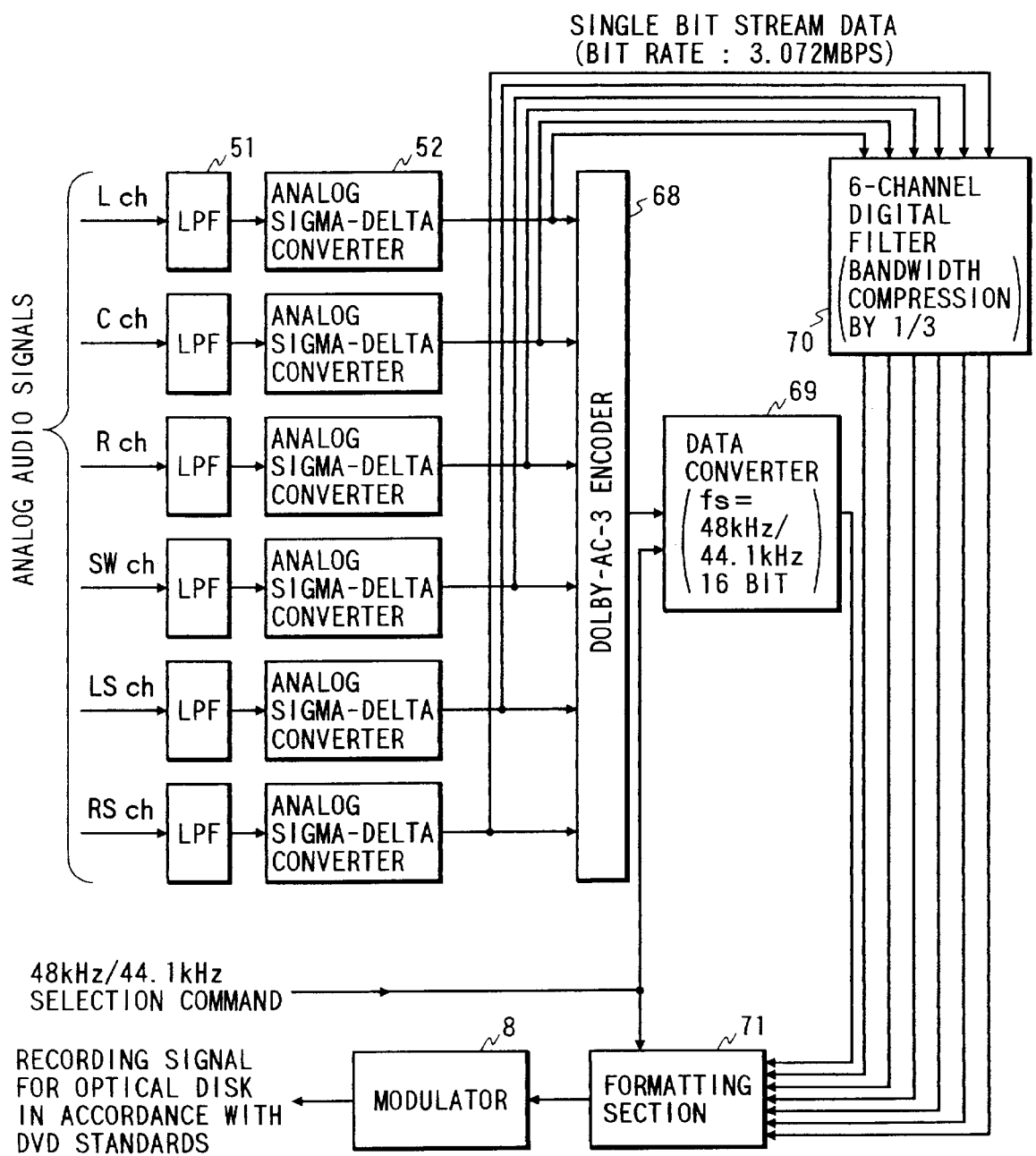
FIG. 10 is a circuit block diagram of a third embodiment of an encoder apparatus according to the present invention, for use with the Dolby-AC-3 multi-channel audio system.

The Dolby-AC-3 system uses six audio channels, i.e. three front channels (the L, C and R channels), a bass compensation channel (SW), and two rear channels (LS, RS). FIG. 10 is a system block diagram of an encoder apparatus for applying the present invention to the Dolby-AC-3 system. This encoder apparatus differs from that of the first embodiment of FIG. 1 in the following respects:

(a) Since there are six analog audio signal channels, a corresponding set of six LPFs 51 is provided to respectively receive these as input signals, with the L LPF output signals being supplied to respective ones of a set of analog sigma-delta modulators 52.

(b) The respective single bit stream data outputs from the sigma-delta modulators 52 are each supplied to a Dolby-AC-3 encoder 68, to be combined into a single stream of encoded data by the Dolby-AC-3 encoding method.

(c) Output single bit stream data are generated from each of the sigma-delta modulators 52 at a rate of 3.072 Mbps, and are then subjected to bandwidth compression by a factor of ⅓ in a 6-channel digital filter circuit 70, and the resultant six single bit stream data signals are input to the formatting section 71.

(d) The formatting section 71 allocates the encoded bit stream from the data converter 69 to the ch0 and ch1 data channels of the audio packets, and allocates the six streams of compressed single bit stream data, from the digital filter circuit 70, to the remaining 8 data channels. In addition the formatting section 71 adds, to the ADI portion of each audio packet, discrimination data which specifies that the audio data have been formatted using a supplementary stream mode (i.e. specifies the first of the two stream modes shown in Table 3), and also specifies that the recorded data consist of encoded multi-channel audio signals which are in accordance with the Dolby-AC-3 system.

By comparison with the encoder apparatus embodiment used for the Dolby Surround system, shown in FIG. 6, the above encoder apparatus for the Dolby-AC-3 system differs in that a Dolby-AC-3 encoder 68 is utilized, in that the digital filter circuit 70 executes bandwidth compression by a factor of 1/3, and in that the formatting section 71 inserts different information into the discrimination data of each ADI portion of the audio packets. In other respects, the configuration and operation are very similar to that of the Dolby Surround encoder apparatus of FIG. 6.

The reason for applying a bandwidth compression factor of 1/3 to the single bit stream data from the analog sigma-delta modulators 52 is as follows. Since the Dolby-AC-3 system uses six audio channels, applying bandwidth compression by such a factor ensures that the ratio of the rate of generating encoded PCM data which are input to the formatting section 71 to the rate at which the compressed single bit stream data are supplied to the formatting section 71 will become 2:8, i.e. a ratio which enables the single bit stream data and PCM data to be conveyed together by the stream of audio packets generated by the formatting section 71 as described hereinabove for the preceding embodiments.

Figure 11:
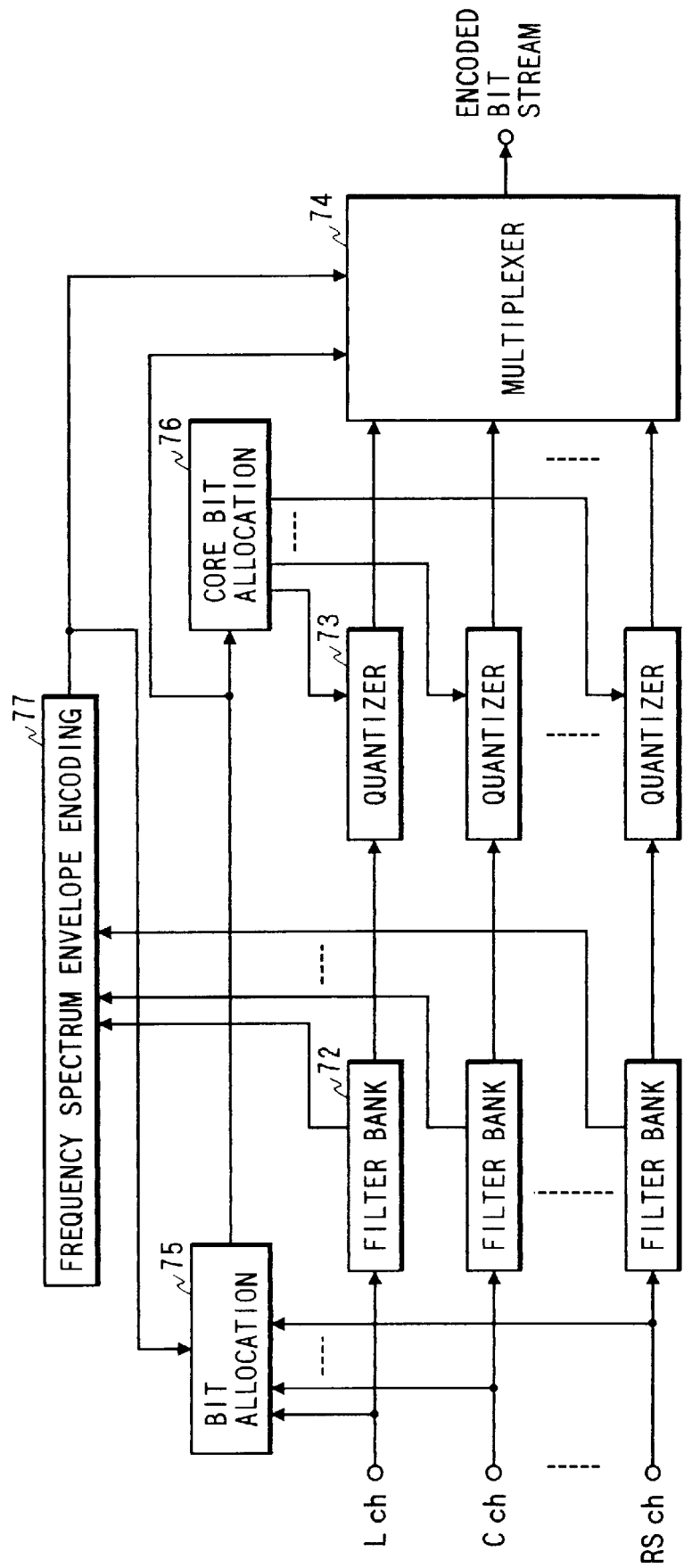
FIG. 11 is a functional block diagram of a Dolby-AC-3 encoder for use in the encoder apparatus embodiment of FIG. 10.

FIG. 11 is a functional block diagram of a suitable configuration for the Dolby-AC-3 encoder 68 of FIG. 10. The operation of this encoder is as follows. Each of the six single bit stream data signals from the analog sigma-delta modulators 52 is input to a corresponding one of a set of six filter banks 72. Each of the filter banks 72 applies frequency analysis of the corresponding data stream, using MDCT (Modified Discrete Cosine Transform) processing, to convert the data from time-axis samples into frequency components, and supplies the resultant analysed signal to a corresponding one of a set of six quantizers 73, with the quantized result being input to a multiplexer 74. In addition, each flow of single bit stream data is input to a bit allocation section 75, which generates auxiliary information for use in bit allocation, and supplies the information to a core bit allocation section 76. The respective output signals from the filter banks 72 are also input to a spectrum envelope encoder 77 which derives differentially encoded data, obtained in the frequency domain, expressing the envelope of the frequency spectrum of the single bit stream data, and supplies these differential encoded data to the bit allocater 75 and also to the multiplexer 74. Based on the auxiliary information and on the differentially encoded data, the core bit allocating section 76 generates bit allocation information for each of the quantizers 73, and outputs this information to the respective quantizers. Based on the bit allocation information thereby supplied, each of the quantizers 73 executes quantization of the input signal supplied from the corresponding one of the filter banks 72. By referring to the differentially encoded data and to the auxiliary information derived by the bit allocation section 75, the multiplexer 74 combines the data streams supplied from the respective quantizers 73 into a single digital signal, i.e. a flow of single bit stream data, and outputs this to the data converter 69.

As a result, an acoustic masking characteristic is obtained, due to the allocation of core bits on the basis of the respective frequency spectrum envelopes corresponding to the six audio channels (L to RS). In addition, due to the fact that the bit allocating section 75 calculates auxiliary information for logically ensuring maximum accuracy of bit allocation, encoded single bit stream data is obtained which has bits allocated in a manner ensuring maximum efficiency of encoding.

Figure 12:
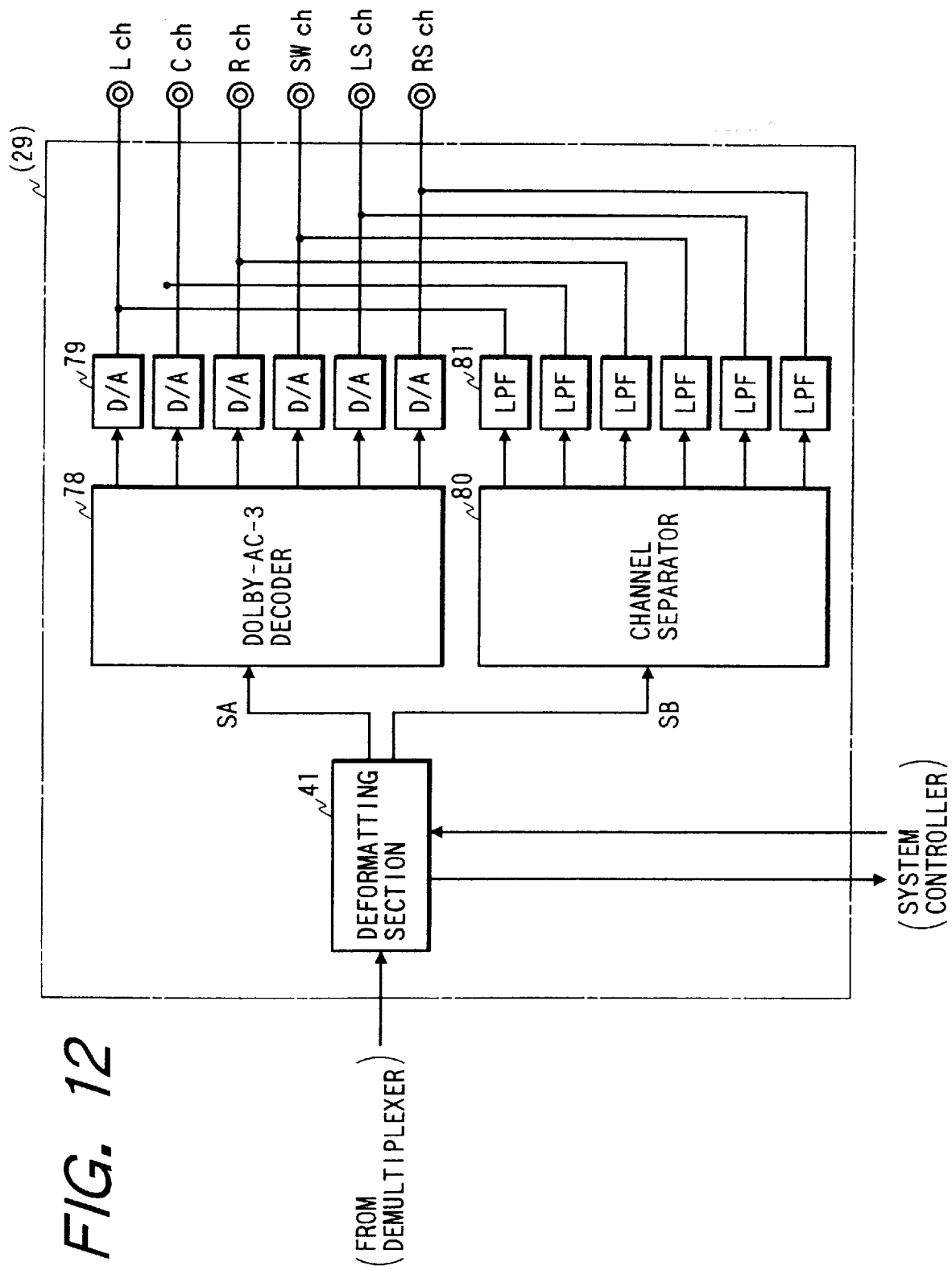
FIG. 12 is a circuit block diagram of a third embodiment of a decoder apparatus according to the present invention, for use with the Dolby-AC-3 system.

The basic configuration and operation of a decoder apparatus for Dolby-AC-3 operation can be similar to those described for the first decoder apparatus embodiment of FIG. 3, with only the configuration of the audio decoder 29 being different, as shown in the system block diagram of FIG. 12. With this encoder, the stream of encoded audio data supplied to the deformatting section 41 from the system controller 32 is separated into the streams SA, SB of encoded PCM data and single bit stream data respectively. The PCM data SA are supplied to a Dolby-AC-3 decoder 78 which executes Dolby-AC-3 decoding processing, to be converted to six streams of PCM data respectively corresponding to the audio channels L, C, R, S, LS and RS. These PCM data streams are input to respective ones of a set of six D/A converters 79, to thereby recover the six analog audio signals of the L, C, R, S, LS and RS channels from the PCM data.

The single bit stream data SB are supplied to a channel separator 80, to be separated into six streams of PCM data respectively corresponding to the L, C, R, S, LS and RS audio channels. These streams are input to respective ones of a set of six LPFs 81, to thereby recover the six analog audio signals of the L, C, R, S, LS and RS channels from the single bit stream data.

Figure 13:
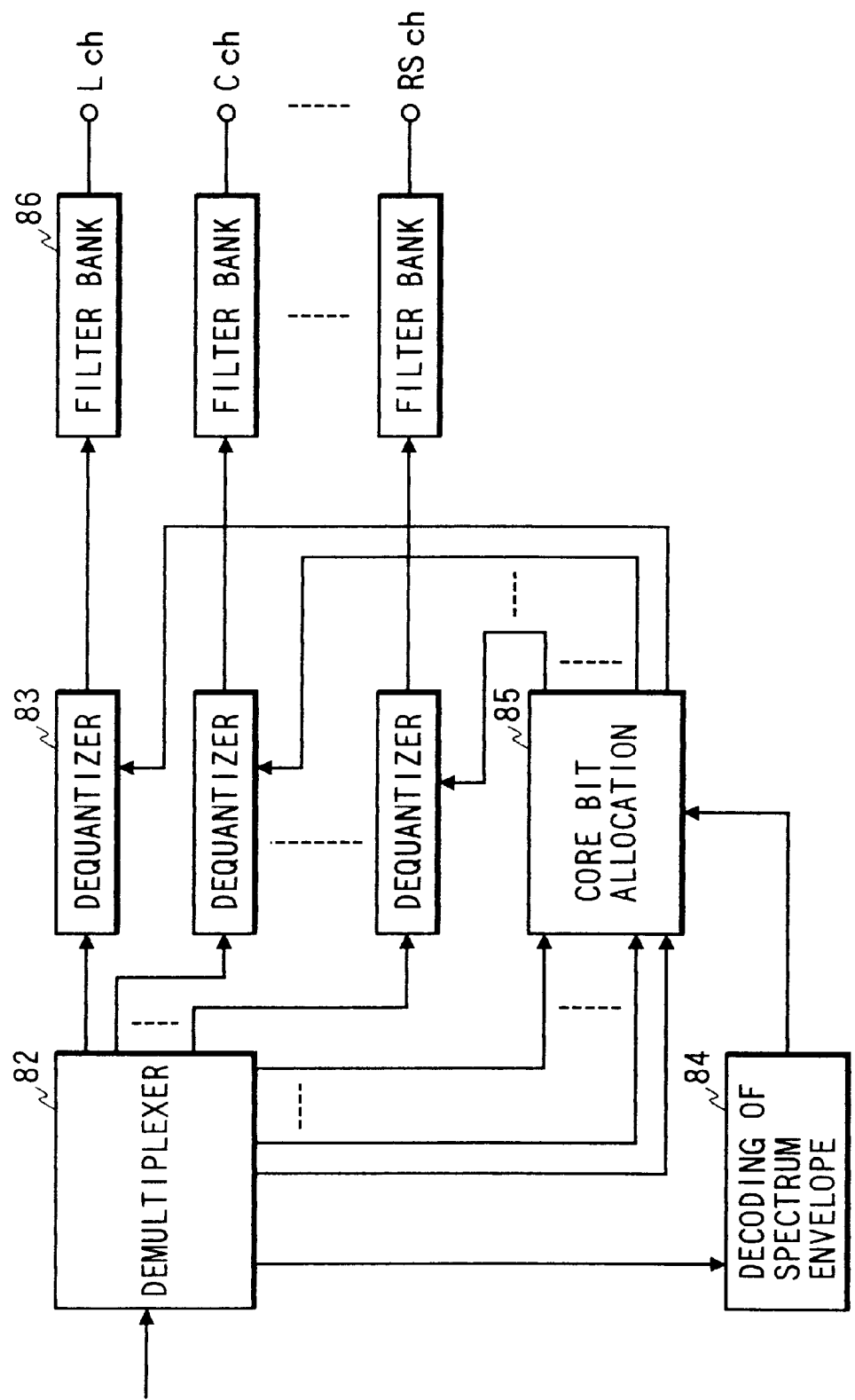
FIG. 13 is a functional block diagram of a Dolby-AC-3 decoder for use in the decoder apparatus embodiment of FIG. 12.

FIG. 13 is a functional block diagram for illustrating the operation of the Dolby-AC-3 decoder 78 of FIG. 12. The operation of this decoder is the inverse of that of the encoder shown in FIG. 11. The encoded PCM data SA from the deformatting section 41 are supplied to a demultiplexer 82, to be separated into six bit streams respectively corresponding to the six audio channels, which are supplied to respective ones of a set of six dequantizers 83. In addition, the demultiplexer 82 extracts the aforementioned differentially encoded data which express the frequency spectrum envelope information, and the auxiliary information relating to bit allocation, and supplies these to the spectrum envelope decoder 84 and core bit allocating section 85 respectively. The core bit allocating section 85 utilizes decoded differential data (which are derived by the spectrum envelope decoder 84 from the differentially encoded data) and the auxiliary information to generate bit allocation data, for determining the allocation of bits to each of the audio channels, and supplies the bit allocation data to each of the quantizers 83. Based on the bit allocation data thus received, each of the quantizers 83 performs dequantizing processing of the single bit stream data supplied thereto, and supplies the resultant data to a corresponding one of a set of six filter banks 86. Each of these filter banks 86 executes inverse MDCT processing, to convert the frequency data supplied thereto into PCM samples arrayed along the time axis, to thereby obtain the six streams of PCM data which are supplied to the D/A converters 79.

(3) DTS System

The DTS system is also a 6-channel form of multi-channel audio system, with the channels respectively designated as L, C, R, SW, LS, and RS. Thus the requisite encoder apparatus and decoder apparatus can be regarded simply as modifications of the Dolby-AC-3 encoder apparatus and decoder apparatus described hereinabove, but with the encoder 68 of FIG. 10 and the decoder 78 of FIG. 12 being reconfigured in accordance with the requirements of the DTS system rather than the Dolby-AC-3 system. In other respects, the configuration and operation can of each of the encoder apparatus and decoder apparatus can be considered to be similar to those described for the Dolby-AC-3 embodiments.

Figure 14:
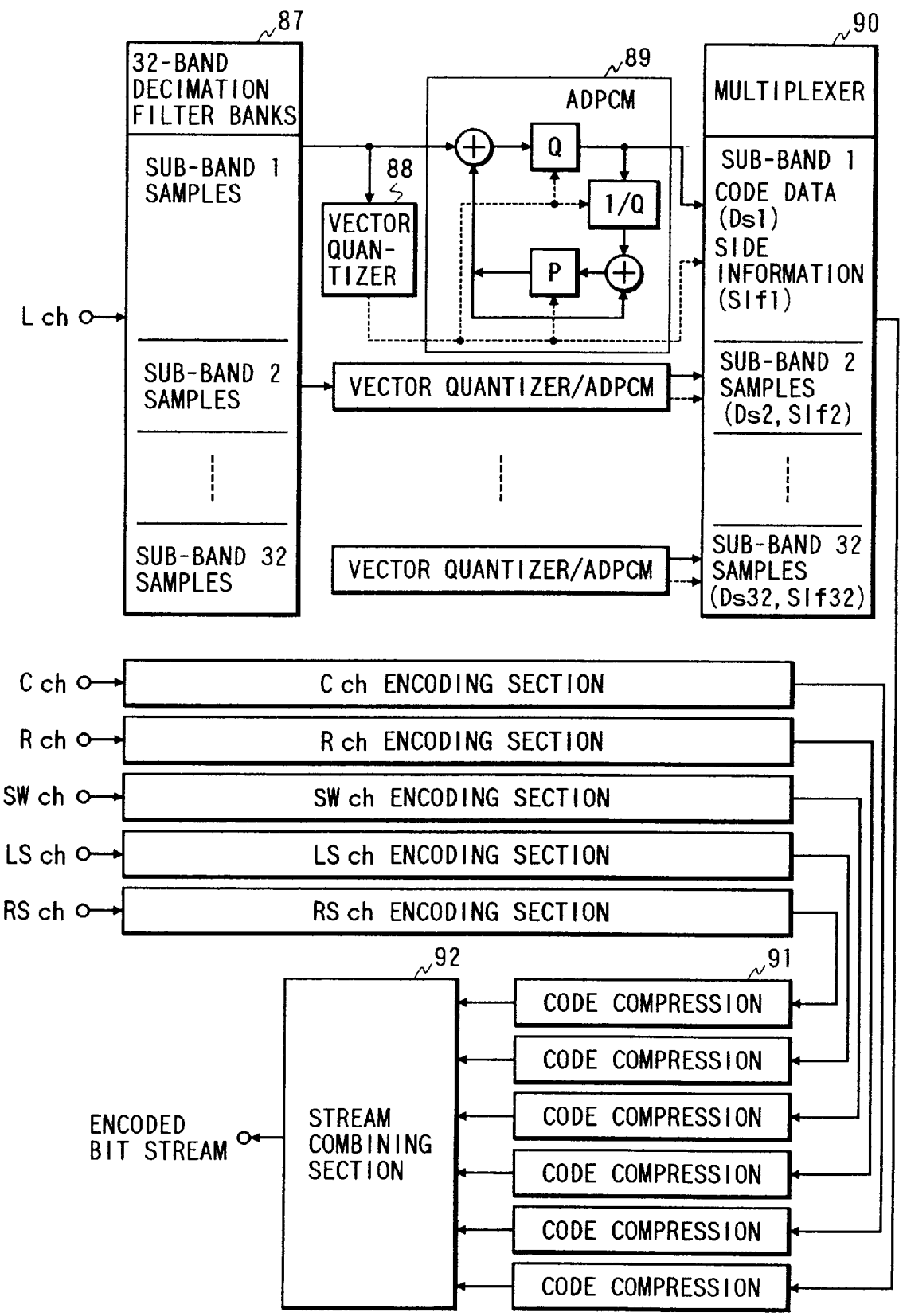
FIG. 14 is a functional block diagram of an embodiment of a DTS encoder for use with the DTS multi-channel audio system, in a DTS encoder apparatus which is a modification of that shown in FIG. 10.

FIG. 14 is a functional block diagram of an encoder for use with the DTS system (i.e. corresponding to the Dolby-AC-3 encoder 68 shown in FIG. 10). In FIG. 14, each of the six streams of single bit stream data derived by the analog sigma-delta modulators 52 is input to a corresponding one of a set of encoding sections. Each of these has the internal configuration which is shown in FIG. 14 for the encoding section which receives the L-channel single bit stream data. This L-channel single bit stream data signal is input to a set of 32 band decimation filter banks 87, i.e. which contains banks of digital filters for converting the single bit stream data to 32 streams of sub-band samples, with each of these streams being supplied to corresponding one of a set of 32 quantizing/ADPCM circuits, each formed of a vector quantizer 88 and an ADPCM (Adaptive Differential PCM) circuit 89 as shown. The ADPCM circuit 89 executes adaptive quantization of the values of difference between the actual input signal and the predicted value of the input signal, while referring to quantized values of the actual input signal which are produced from the vector quantizer 88.

The streams of quantized data from the ADPCM circuit 89 and of quantized data from the vector quantizer 88 which are obtained for each of the sub-bands, and which are designated as the sub-band code data (Dsi) and the side information (SIfi) respectively (where "i" takes the values 1 to 32 respectively, for the 32 sub-bands, as indicated in FIG. 14) are supplied to a multiplexer 90. The multiplexer 90 combines these 32 pairs of Dsi and SIfi data streams into a signal data stream, which is supplied to a corresponding one of a set of six code compression circuits 91. Each of these code compression circuits 91 performs code compression based upon the overshoot characteristics of the input data, and supplies the compressed data to a stream combining section 92, which combines the six streams of compressed code data from the code compression circuits 91 into a single encoded bit stream. The encoding processing described above is performed separately for each of the six audio channels. The encoded bit stream which is output from the stream combining section 92 is supplied to the data converter 69 shown in FIG. 10.

Figure 15:
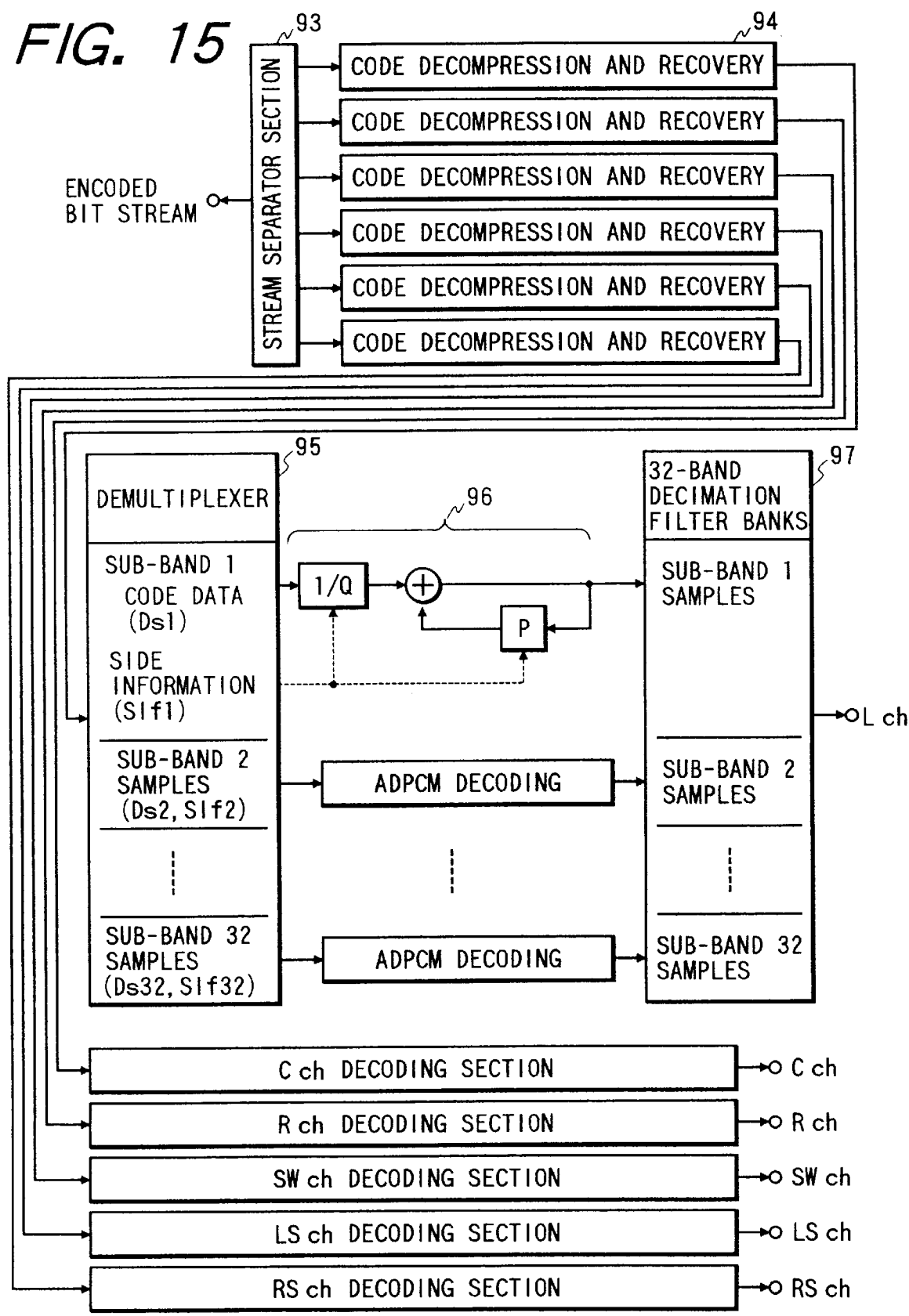
FIG. 15 is a functional block diagram of a DTS decoder, for use in a DTS decoder apparatus which is a modification of that shown in FIG. 12.

FIG. 15 is a functional block diagram of an embodiment of a decoder according to the present invention for the DTS system, i.e. which constitutes the decoder 78 shown in FIG. 12. The encoded PCM data stream (i.e. stream SA) which is extracted by the deformatting section 41 is input to a stream analyzer 93, to be analyzed and thereby separated into six data streams respectively corresponding to the six audio channels. These are input to respective ones of a set of six code expansion and regeneration circuits 94, and the resultant six streams of decompressed data are input to respective ones of a set of six channel decoding sections. Each of these channel decoding sections has an internal configuration which is identical to that shown in FIG. 15 for the channel decoding section which receives the encoded data corresponding to the audio L-channel. As shown, this cds is made up of a demultiplexer 95, a ADPCM decoder 96 and a 32-band decimation filter banks 97. The demultiplexer 95 separates the stream of data supplied thereto into 32 sets of DSi and SIfi data streams, respectively corresponding to the 32 sub-bands. Each stream of DSi and SIfi data is supplied to a corresponding one of a set of 32 ADPCM decoders 96, to be converted to a stream of sub-band samples which is obtained by quantizing each difference between the actual input value and a predicted input value of data supplied to the ADPCM decoder 96. The resultant streams of sub-band samples are input to a 32-band decimation filter bank 97, which combines these 32 streams of sub-band samples to recover a stream of PCM data for the corresponding audio channel.

In that way, the encoder of FIG. 15 converts the encoded bit stream (SA) derived by the deformatting section 41 into six streams of PCM data respectively corresponding to the six audio channels, which are then supplied to the D/A converters 79 shown in FIG. 12.

(4) SDDS System

Figure 16:
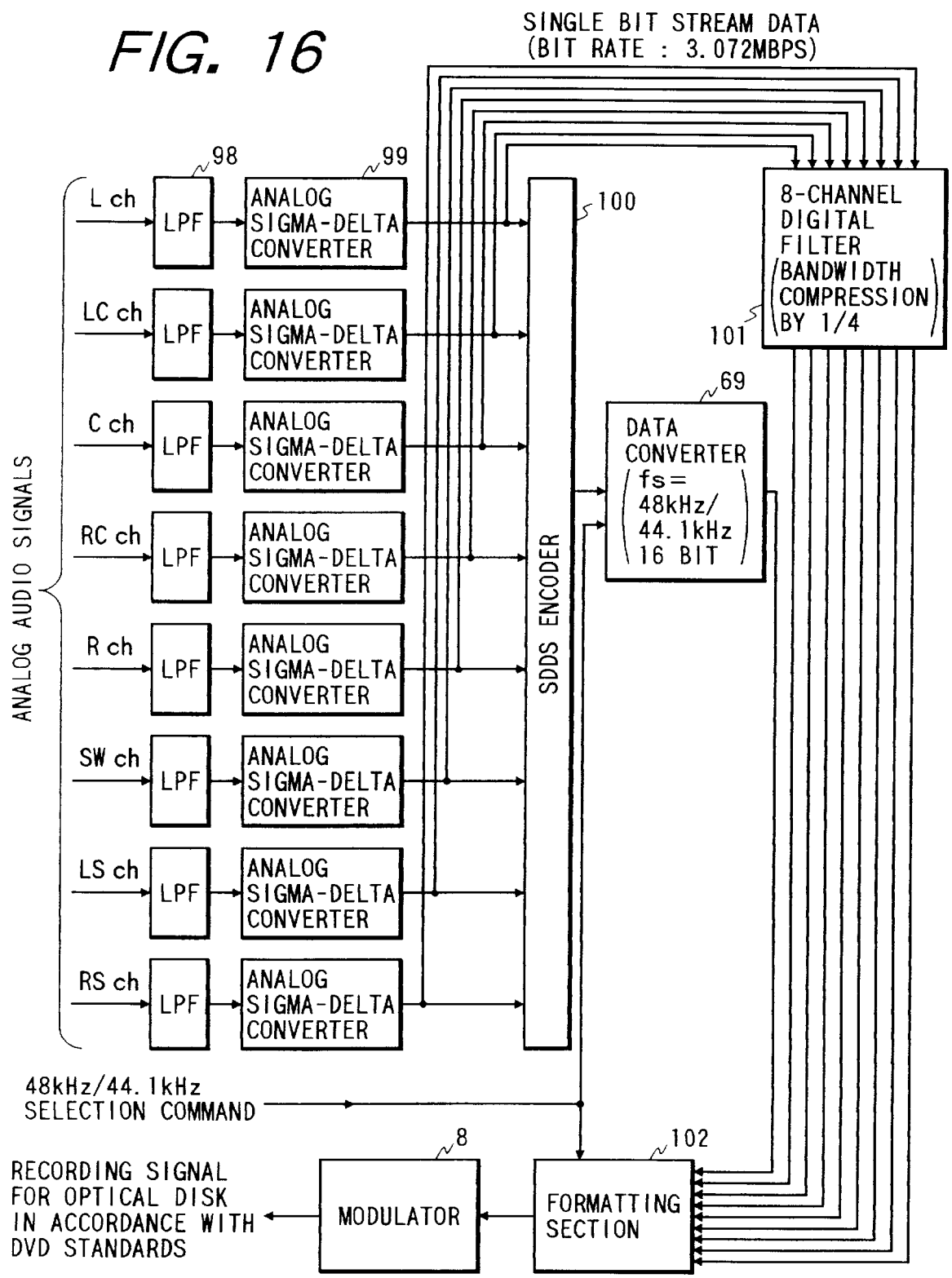
FIG. 16 is a circuit block diagram of a fourth embodiment of an encoder apparatus according to the present invention, for use with the SDDS multi-channel audio system.

The SDDS multi-channel audio system utilizes a total of 8 audio channels, i.e. five front channels (L, LC, C, RC, R), a bass compensation channel (SW), and two rear channels (LS, RS). The overall configuration and operation of an embodiment of an encoder apparatus for applying the SDDS system to the present invention is shown in the system block diagram of FIG. 16. The operation and configuration of this embodiment differ from the first embodiment of an encoder apparatus shown in FIG. 1 with respect to the following points:

(a) Since the system utilizes a total of eight audio channels, a corresponding set of eight LPFs 98 and eight analog sigma-delta modulators 99 are provided to respectively process the input analog audio signals.

(b) Each of the data streams produced from the N analog sigma-delta modulators 99 is input to a SDDS encoder 100, to be encoded by the SDDS method into a single data stream.

(c) Single bit stream data are generated from each of the sigma-delta modulators 99 at a rate of 3.072 Mbps and are then subjected to bandwidth compression by a factor of ¼, in an 8-channel digital filter circuit 101, and the resultant eight streams of single bit stream data are input to the formatting section 102.

(d) The formatting section 102 allocates the stream of PCM data from the data converter 69 to the ch0 and ch1 data channels of the audio packets, and allocates the eight streams of compressed single bit stream data from the digital filter circuit 70 to the remaining 8 data channels. In addition the 8-channel digital filter c101 adds, to the ADI portion of each audio packet, discrimination data which specifies that the audio data have been formatted using a supplementary stream mode (i.e. specifies the first of the two stream modes shown in Table 3), and also specifies that the recorded data consist of encoded multi-channel audio signals which are in accordance with the SDDS system.

By comparison with the encoder apparatus embodiment used for the Dolby Surround system, shown in FIG. 6, the above encoder apparatus for the SDDS system differs in that a SDDS encoder 100 is utilized, in that the digital filter circuit 101 executes bandwidth compression by a factor of ¼, and in that the formatting section 102 inserts different information into the discrimination data of the ADI portions of the audio packets. In other respects, the configuration and operation are very similar to that of the Dolby Surround encoder apparatus of FIG. 6.

The reason for applying a bandwidth compression factor of ¼ to the single bit stream data from the analog sigma-delta modulators 99 is as follows. Since the SDDS system uses eighth audio channels, applying bandwidth compression by such a factor ensures that the ratio of the rate of generating encoded PCM data which are input to the formatting section 102 to the rate at which the compressed single bit stream data are supplied to the formatting section 102 will become 2:8, i.e. a ratio which enables the single bit stream data and PCM data to be conveyed together by the stream of audio packets generated by the formatting section 102 as described above for preceding embodiments.

Figure 17:
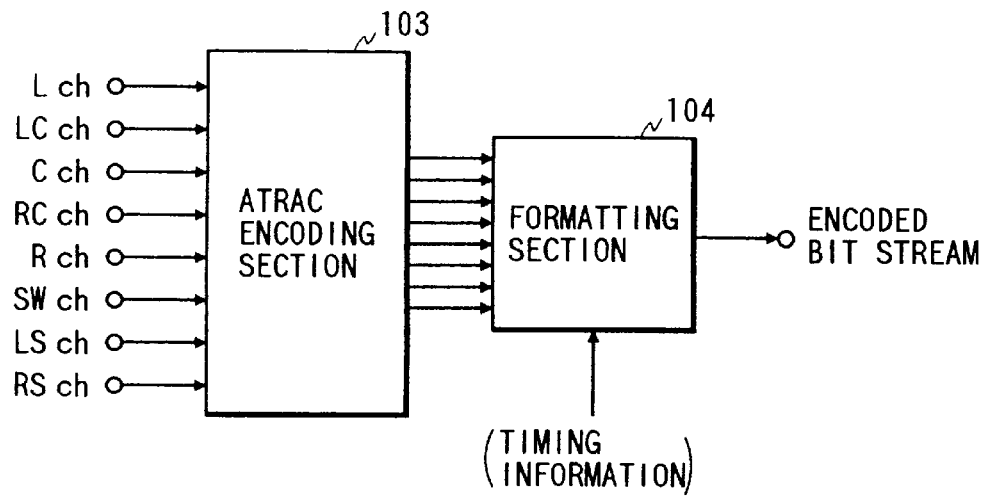
FIG. 17 is a functional block diagram of a SDDS encoder for use in the encoder apparatus embodiment of FIG. 16.

FIG. 17 is a functional block diagram of the SDDS encoder 100. The SDDS encoder 100 uses an ATRAC encoding section 103 to encode each of the streams of single bit stream data produced from the analog sigma-delta modulators 99, to thereby compress the data by a factor of approximately ⅕. The resultant eight compressed data streams are input to a formatting section 104, which adds timing information to the compressed data, and combines the resultant data into a single encoded bit stream.

The ATRAC encoding section 103 classifies the input data into three categories, i.e. a high-frequency region, and intermediate-frequency region and a low-frequency region, with MDCT processing being applied to transform the input data into data of these respective categories in the frequency domain. High-efficiency encoding of the resultant data is then executed, based on acoustic principles, through data management which utilizes minimum audibility characteristics and the masking effect.

A decoder apparatus corresponding to the above encoder apparatus can have substantially the same basic configuration as the first encoder apparatus embodiment of FIG. 3. However the configuration of the audio decoder 29 of a decoder apparatus for SDDS encoded data is different from that of FIG. 3, with an embodiment being shown in FIG. 18. The operation of this decoder apparatus is as follows. As in FIG. 3, the stream of encoded data supplied to the deformatting section 41 from the system controller 32 is separated into the streams SA, SB of encoded PCM data and single bit stream data respectively. The SDDS-encoded PCM data SA are supplied to a SDDS decoder 105 which executes SDDS decoding processing, to be converted to eight streams of PCM data respectively corresponding to the audio channels L, LC, C, RC, R, SW, LS and RS. These PCM data streams are input to respective ones of a set of eight D/A converters 106, to thereby recover the eight analog audio signals of the L, LC, C, RC, R, SW, LS and RS channels from the PCM data.

The single bit stream data SB are supplied to a channel separator 107, to be separated into six streams of PCM data respectively corresponding to the L, LC, C, RC, R, SW, LS and RS audio channels. These streams are input to respective ones of a set of six LPFs 108, to thereby recover the six analog audio signals of the L, LC, C, RC, R, SW, LS and RS channels from the single bit stream data.

Figure 18:
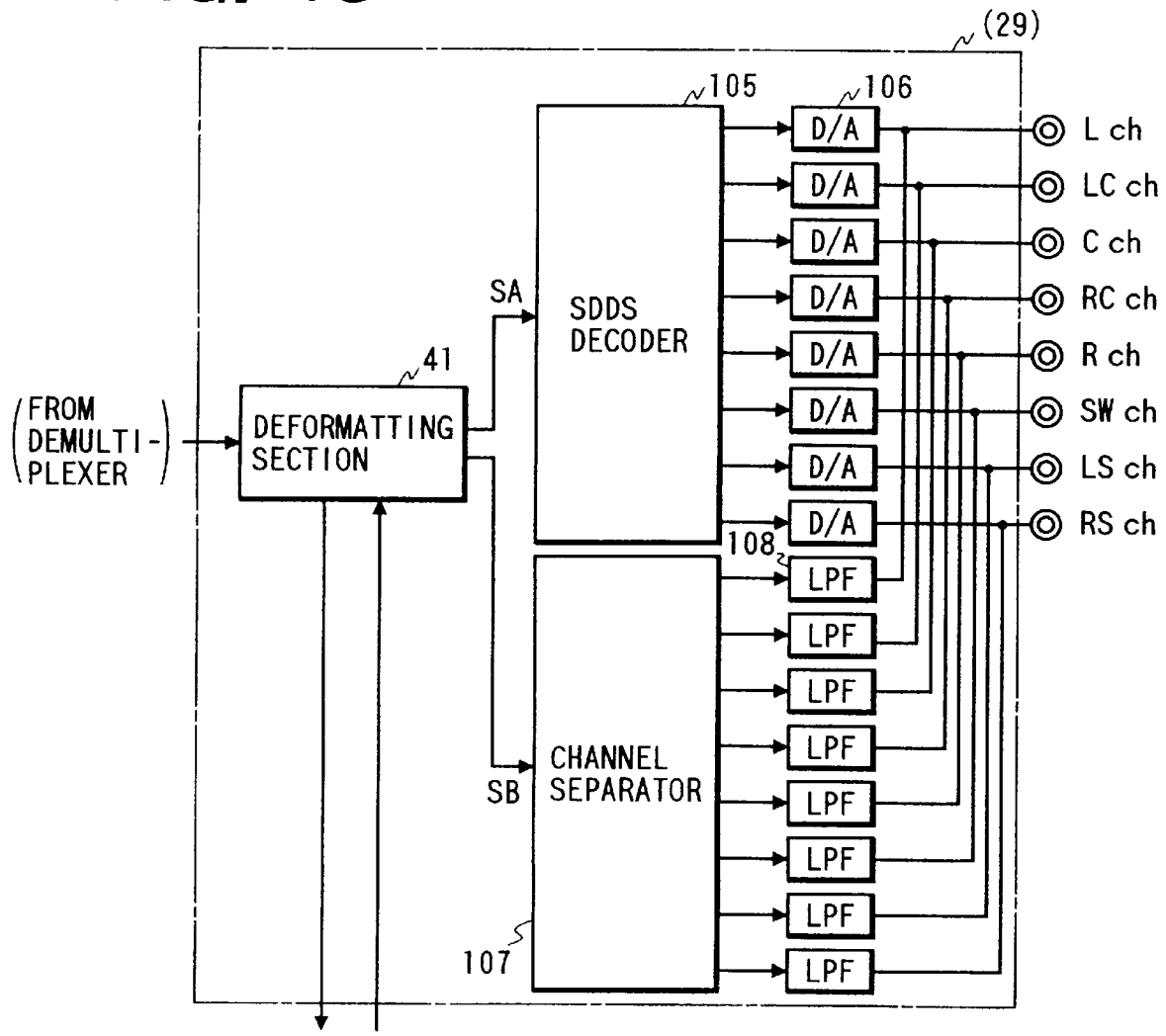
FIG. 18 is a circuit block diagram of a fourth embodiment of a decoder apparatus according to the present invention, for use with the SDDS system.
Figure 19:
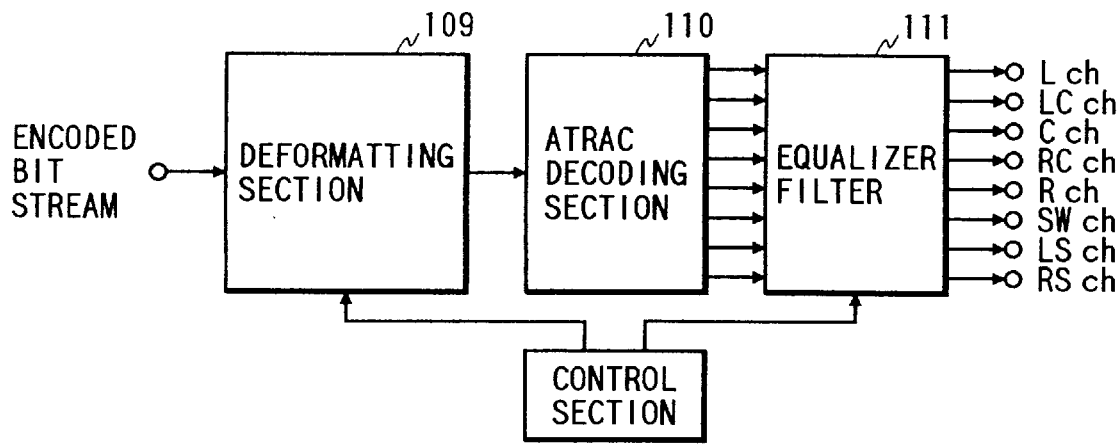
FIG. 19 is a functional block diagram of a SDDS decoder for use in the decoder apparatus embodiment of FIG. 18.
Figure 20:
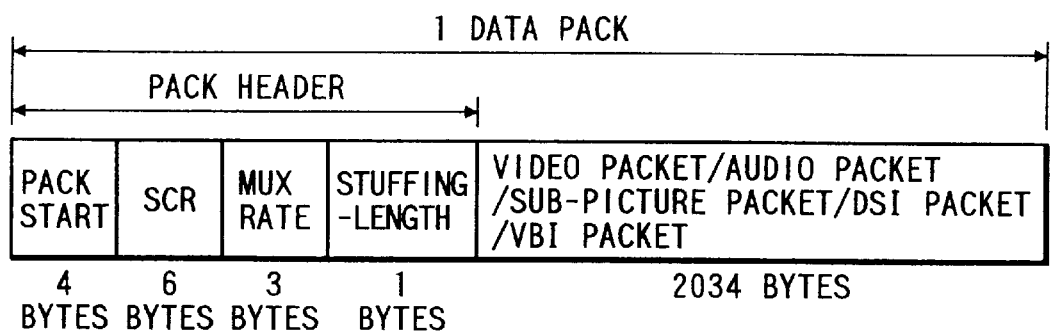
FIG. 20 is a diagram illustrating the basic configuration of a data pack which is in accordance with the DVD standards.
Figure 21:
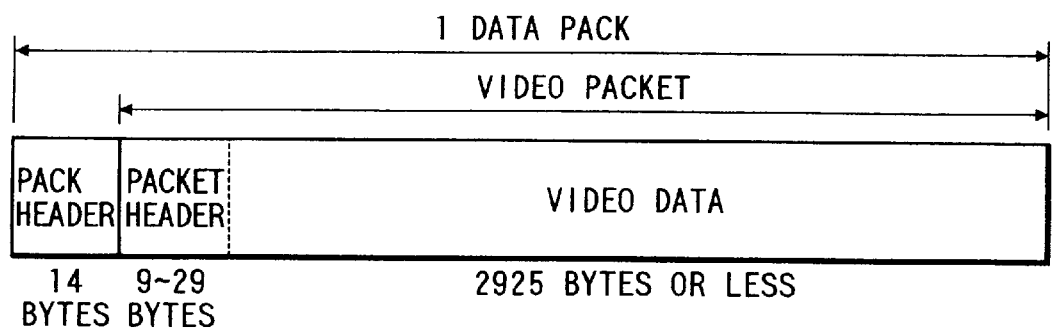
FIG. 21 is a diagram illustrating the configuration of a video pack which is in accordance with the DVD standards.
Figure 24B:
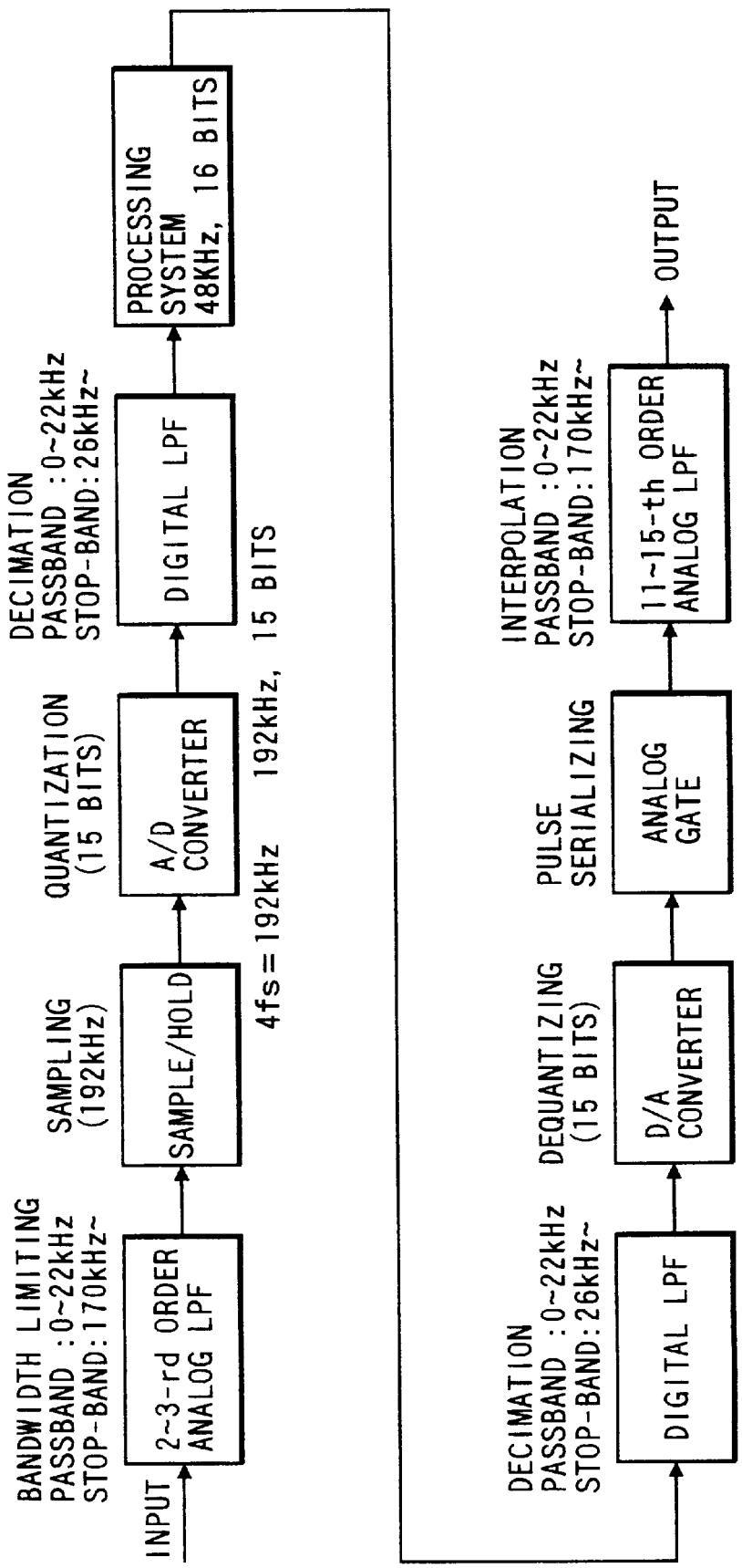
Figure 24C:
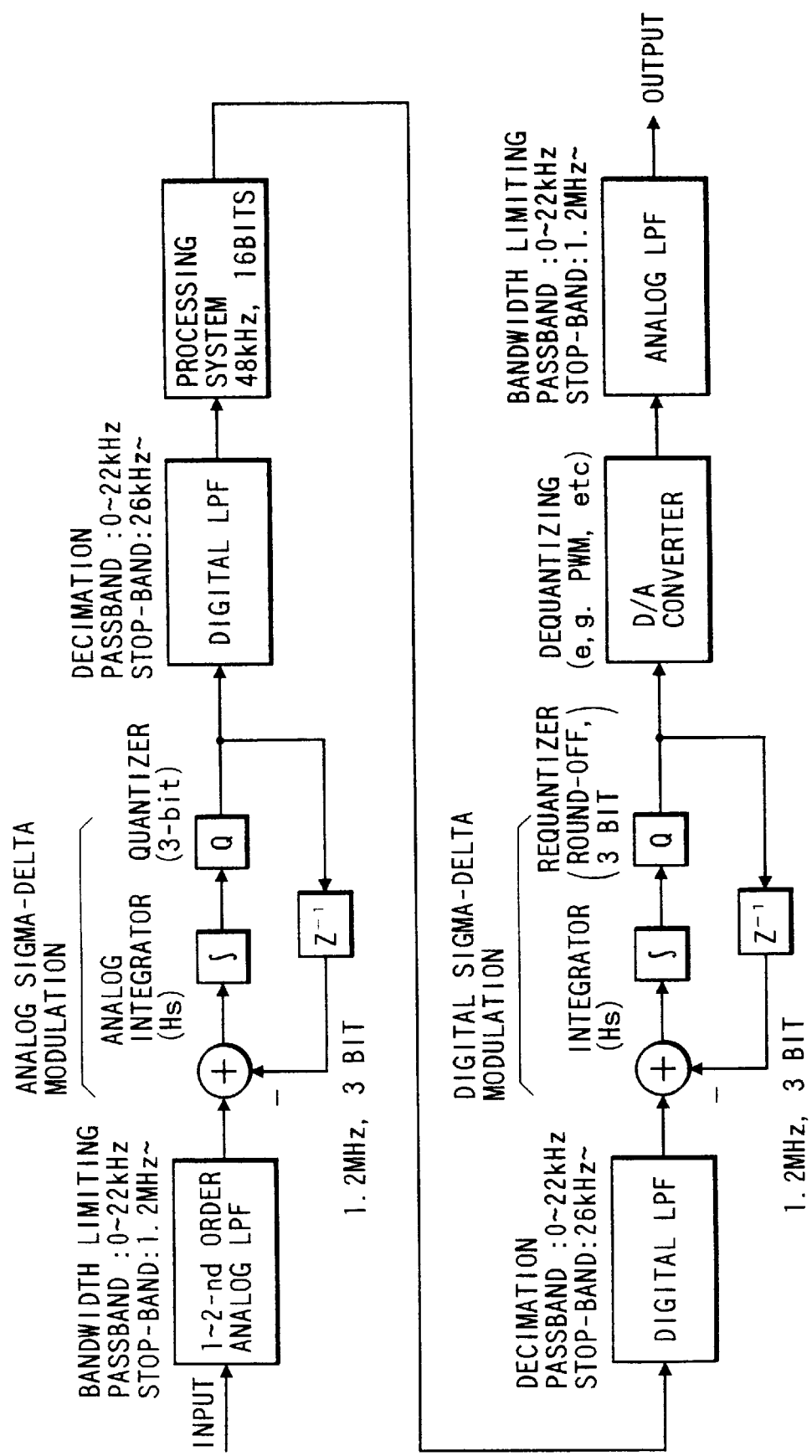
Figure 24D:
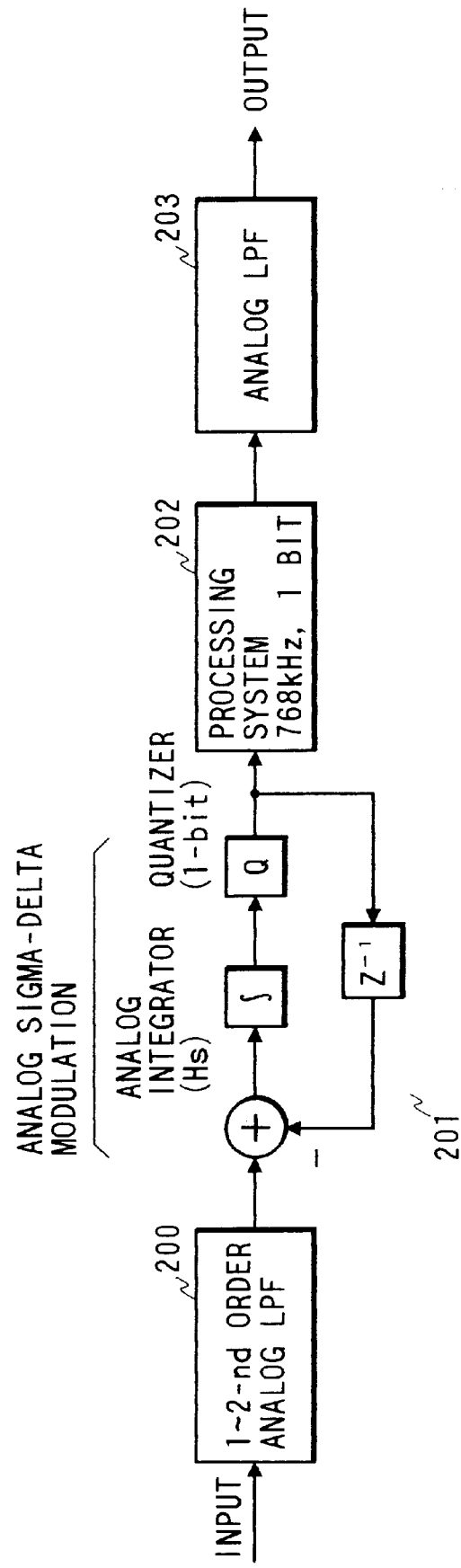
FIG. 24D is a corresponding diagram for illustrating the single bit stream encoding technique used with the present invention.

FIG. 19 is a functional block diagram for illustrating the operation of the SDDS decoder 105 of FIG. 18. In FIG. 19, the deformatting section 109 performs deformatting processing which reverses the processing executed by the formatting section 104 of FIG. 17. The resultant streams of deformatted SDDS-encoded data are input to an ATRAC decoding section 110, to recover eight channels of PCM data respectively corresponding to the eight audio channels, which are supplied to an equalizer filter section 111 to apply compensation. The resultant eight PCM data streams are supplied to respective ones of the D/A converters 106 shown in FIG. 18.

For each of the eight channels, the ATRAC decoding section 110 restores the three categories of frequency domain data (i.e. high-frequency region, intermediate-frequency region and low-frequency region data) to the time domain, as streams of samples along the time axis, by applying inverse MDCT processing. The high-frequency region data are then passed through a delay filter, while the intermediate-frequency region and low-frequency region data are combined by a combining filter, then the delayed high-frequency region data and the combined intermediate-frequency region and low-frequency region data are combined by a second combining filter, to thereby execute decoding to recover a stream of time-axis data, i.e. PCM data for an audio channel.

From the above description of preferred embodiments, it can be understood that the present invention provides the following advantages:

Firstly, the invention provides a new type of optical recording disk whose specification are based directly on the audio specifications which are set out in the DVD standards, but which conveys audio signals recorded as single bit stream data, while also conveying these same audio signals recorded in the conventional manner as PCM data (i.e. with the sampling frequency being 48 kHz). Although such single bit stream data and PCM data expressing an audio signal are generated at respectively different bit rates, respective recording channel capacities are allocated in accordance with these respective bit rates, thereby enabling both types of data to be conveyed together in stream of audio packets which are basically as specified in the DVD standards. In that way the disadvantages of PCM recording of audio signals, with regard to reproduction bandwidth and signal/noise ratio, can be overcome when such a optical recording disk is played using a playback apparatus which is capable of decoding the single bit stream data, i.e. it becomes possible to provide a DVD playback apparatus which can function both as a very high-fidelity audio reproduction apparatus and also as an audio-visual presentation apparatus (when playing conventional types of DVD).

However in addition, existing types of DVD playback apparatus can be easily modified (i.e. by a minor alteration to a system control program) to play such optical recording disks, with audio signals being recovered from the playback PCM data through the same process as for conventional DVDs.

Secondly, with such an audio optical recording disk it becomes possible to record audio data as the aforementioned single bit stream data and also as PCM data at a sampling frequency of 44.1 kHz. By periodically inserting appropriate numbers of PCM data padding bits, it is again ensured that the respective bit rates of the PCM data and the single bit stream data are matched to the channel capacities assigned to the two types of data in the stream of audio packets. In that case, since the usual sampling frequency employed for conventional CDs is 44.1 kHz, the playback PCM data obtained from such an audio optical recording disk is compatible with existing audio equipment designed for CD playback applications.

Thirdly, an audio optical recording disk according to the present invention is applicable to recording encoded audio signals which are generated by various different types of multi-channel audio system, i.e. whereby encoding is executed to combine a number of audio signals into a pair of signals or a single signal, prior to recording. With the present invention, all of the audio channel signals can be separately recorded directly as respective single bit stream data signals, thereby ensuring that very high fidelity of reproduction becomes possible, while in addition the pair of signals or single signal that is obtained by combining the multi-channel audio signals is recorded in the form of PCM data. Hence, it becomes possible with such an audio optical recording disk to select either playback data which provide maximum fidelity of reproduction or playback data which are compatible with existing types of multi-channel (PCM) playback apparatus. Examples of multi-channel audio systems to which the present invention is thus applicable are the Dolby Surround system, the Dolby-AC-3 system, the DTS system, the SDDS system, etc.

Moreover, the invention provides encoding and decoding apparatus embodiments for recording such multi-channel audio signals whereby encoding of the multi-channel audio signals to combine these into a single signal or a pair of signals prior to recording (and subsequent decoding at the time of playback) is performed entirely by digital processing, rather than by the conventional analog processing techniques. The well-known advantages of digital processing can thereby be attained, in addition to the other advantages provided by the invention.

What is claimed is:

1. An optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey left (L) and right (R) channel analog audio signals respectively encoded as pulse code modulation (PCM) data streams with said fixed number of bits per data sample, and a remaining 8 of said data channels convey said L channel analog audio signal and said R channel analog audio signal encoded by sigma-delta modulation as respective streams of single bit stream data, and wherein each of said audio packets includes an ADI (Audio Data Information) portion containing discrimination data to be detected by a decoder apparatus for judging whether said audio data portion of said audio packet has been recorded in said supplementary stream mode.

2. An optical recording disk according to claim 1, wherein said PCM data have been encoded at a sampling frequency of 48 kHz, and said single bit stream data have been encoded at a bit frequency of 3.072 Mbps when said fixed number of bits has been set as 16 and have been encoded at a bit frequency of 3.840 Mbps when said fixed number of bits has been set as 20.

3. An optical recording disk according to claim 1, wherein said PCM data have been encoded at a sampling frequency of 44.1 kHz and said single bit stream data have been encoded at a bit frequency of 3.072 Mbps when said fixed number of bits has been set as 16 and have been encoded at a bit frequency of 3.840 Mbps when said fixed number of bits has been set as 20, and wherein a number of audio data bits of said PCM data of each of said first and second data channels in each of said audio data portions has been made equal to a total number of bits of said PCM data multiplied by a factor (44.1/48), through insertion of a predetermined number of padding bits in said PCM data of each of said first and second data channels, and wherein said discrimination data of each said ADI portion further contains sampling frequency indication data specifying that said PCM data have been generated at a sampling frequency of 44.1 kHz.

4. An encoder apparatus for generating a recording signal for recording audio data on an optical recording disk as a sequence of audio packets containing respective audio portions, said audio portions being configured in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey left (L) and right (R) channel analog audio signals respectively encoded as pulse code modulation (PCM) data streams with said fixed number of bits per data sample, and a remaining 8 of said data channels convey said L channel analog audio signal and said R channel analog audio signal encoded by sigma-delta modulation as respective streams of single bit stream data, and wherein each of said audio packets includes an ADI (Audio Data Information) portion containing discrimination data to be detected by a decoder apparatus for judging whether said audio data portion of said audio packet has been recorded in said supplementary stream mode, said encoder apparatus comprising:

first and second sigma-delta modulator means (3, 4) for respectively converting said L channel analog audio signal and R channel analog audio signal to first and second streams of single bit stream data, data converter means (5, 6) for converting said first and second streams of single bit stream data to respective first and second PCM data streams with said fixed number of bits per data sample, and formatting means (7) for generating each of said audio data portions for respective audio packets by assigning respective bits of said first and second PCM data streams to said first and second channels, and assigning respective bits of said first and second streams of single bit stream data to said remaining 8 sets of said 10 data channels, for generating said ADI portion of said audio packet, containing said discrimination data, and for attaching said ADI portion to said audio data portion.

5. An encoder apparatus according to claim 4, wherein said PCM data are encoded at a sampling frequency of 48 kHz, and said single bit stream data are encoded at a bit frequency of 3.072 Mbps when said fixed number of bits has been set as 16 and are encoded at a bit frequency of 3.840 Mbps when said fixed number of bits has been set as 20.

6. An encoder apparatus for generating a recording signal for recording audio data on an optical recording disk as a sequence of audio packets containing respective audio portions, said audio portions being configured in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey left (L) and right (R) channel analog audio signals respectively encoded as pulse code modulation (PCM) data streams with said fixed number of bits per data sample, and a remaining 8 of said data channels convey said L channel analog audio signal and said R channel analog audio signal encoded by sigma-delta modulation as respective streams of single bit stream data, and wherein each of said audio packets includes an ADI (Audio Data Information) portion containing discrimination data to be detected by a decoder apparatus for judging whether said audio data portion of said audio packet has been recorded in said supplementary stream mode, wherein said PCM data have been encoded at a sampling frequency of 44.1 kHz, and said single bit stream data have been encoded at a bit frequency of 3.072 Mbps when said fixed number of bits has been set as 16 and have been encoded at a bit frequency of 3.840 Mbps when said fixed number of bits has been set as 20, and wherein a number of audio data bits of said PCM data of each of said first and second data channels in each of said audio data portions has been made equal to a total number of bits of said PCM data multiplied by a factor (44.1/48), through insertion of a predetermined number of padding bits in said PCM data of each of said first and second data channels, and wherein said discrimination data of each said ADI portion further contains sampling frequency indication data to be detected by a decoder apparatus for judging whether said PCM data have been generated at a sampling frequency of 44.1 kHz, said encoder apparatus comprising:

first and second sigma-delta modulator means (3, 4) for respectively converting said L channel and R channel analog audio signals to first and second streams of single bit stream data, data converter means (5, 6) for converting said first and second streams of single bit stream data to respective first and second PCM data streams at said sampling frequency of 44.1 kHz and with said fixed number of bits per data sample, and formatting means (7) for generating each of said audio data portions of respective audio packets by assigning respective bits of said first and second PCM data streams and said padding bits to said first and second channels, and assigning respective bits of said first single bit stream data and second single bit stream data to said remaining 8 sets of said 10 data channels, for generating said ADI portion of said audio packet, containing said discrimination data, and for attaching said ADI portion to said audio data portion.

7. A decoder apparatus for operating on a playback data stream read from an optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey left (L) and right (R) channel analog audio signals respectively encoded as pulse code modulation (PCM) data streams with said fixed number of bits per data sample, and a remaining 8 of said data channels convey said L channel analog audio signal and said R channel analog audio signal encoded by sigma-delta modulation as respective streams of single bit stream data, and wherein each of said audio packets includes an ADI (Audio Data Information) portion containing discrimination data specifying that said audio data portion of said audio packet has been recorded in said supplementary stream mode, wherein said PCM data have been encoded at a sampling frequency of 48 kHz, and said single bit stream data have been encoded at a bit frequency of 3.072 Mbps when said fixed number of bits has been set as 16 and have been encoded at a bit frequency of 3.840 Mbps when said fixed number of bits has been set as 20 said decoder apparatus comprising mode setting means (30, 32) for selectively setting a PCM decoding mode and a single bit stream decoding mode, discrimination means (22, 32) for detecting said discrimination data of said ADI portions of said playback data stream, and for judging said discrimination data to determine whether said optical recording disk has audio data recorded thereon in said supplementary stream mode, deformatting means (41) functioning, when said discrimination means has determined that said optical recording disk has audio data recorded thereon in said supplementary stream mode, to separate said PCM data conveyed by said first and second data channels and said single bit stream conveyed by said remaining 8 data channels of said playback data stream into a first output data stream (SA) and second output data stream (SB) respectively, and for producing only said first output data stream (SA) when said PCM decoding mode has been set and producing only said second output data stream (SB) when said single bit stream decoding mode has been set, first channel separator means (42) for separating and processing said first output data stream (SA) into a stream of PCM data corresponding to said L channel analog audio signal and a stream of PCM data corresponding to said R channel analog audio signal, first and second D/A (Digital-to-Analog) converter means (44, 45) for respectively converting said streams of PCM samples corresponding to said L channel analog audio signal and R channel analog audio signal to said L and R channel analog audio signals respectively, second channel separator means (43) for separating and processing said second output data stream (SB) into a stream of single bit stream data corresponding to said L channel analog audio signal and a stream of single bit stream data corresponding to said R channel analog audio signal, and first and second low-pass filters (46, 47) for respectively converting said streams of single bit stream corresponding to said L channel analog audio signal and R channel analog audio signal to said L channel and R channel analog audio signals.

8. An optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey, encoded as respective pulse code modulation (PCM) data streams with said fixed number of bits per data sample, first (Lt) and second (Rt) combination channel signals which in combination convey three front channel (L, C, R) analog audio signals and one rear channel (R) analog audio signal, with said front channel and rear channel analog audio signals having been encoded to form said first (Lt) and second (Rt) combination channel signals by the Dolby Surround encoding method, wherein a remaining 8 of said data channels convey said three front channel and single rear channel analog audio signals encoded by sigma-delta modulation as respective streams of single bit stream data, and wherein each of said audio packets includes an ADI (Audio Data Information) portion containing discrimination data to be detected by a decoder apparatus for judging whether said audio data portion of said audio packet has been recorded in said supplementary stream mode and whether said first and second combination channel signals have been generated by the Dolby Surround encoding method.

9. An optical recording disk according to claim 8, wherein said PCM data are encoded at a sampling frequency of 48 kHz, and said single bit stream data are encoded at a bit frequency of 3.072 Mbps when said fixed number of bits has been set as 16 and are encoded at a bit frequency of 3.840 Mbps when said fixed number of bits has been set as 20.

10. An encoder apparatus for generating a recording signal for recording audio data on an optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey, encoded as respective pulse code modulation (PCM) data streams with said fixed number of bits per data sample, first (Lt) and second (Rt) combination channel signals which in combination convey three front channel (L, C, R) analog audio signals and one rear channel (R) analog audio signal, with said front channel and rear channel analog audio signals having been encoded to form said first (Lt) and second (Rt) combination channel signals by the Dolby Surround encoding method, wherein a remaining 8 of said data channels convey said three front channel and single rear channel analog audio signals encoded by sigma-delta modulation as respective streams of single bit stream data, wherein each of said audio packets includes an ADI (Audio Data Information) portion containing discrimination data specifying that said audio data portion of said audio packet has been recorded in said supplementary stream mode and specifying that said first and second combination channel signals have been generated by the Dolby Surround encoding method, said encoder apparatus comprising sigma-delta modulator means (52) for converting said three front channels (L, C, R) analog audio signals and one rear channel (R) analog audio signal to respective ones of 4 streams of single bit stream data, encoding means (53) for encoding said streams of single bit stream data to form said first and second combination channel signals (Lt, Rt) as respective streams of single bit stream data, by the Dolby Surround encoding method, first and second data converter means (54, 56) for converting said first and second combination channel signals (Lt, Rt) to respective first and second PCM data streams with said fixed number of bits per data sample, bandwidth compression means (57) for applying bandwidth compression by a factor of ½ to each of said 4 streams of single bit stream data, and formatting means (58) for generating each of said audio data portions of respective audio packets by assigning respective bits of said first and second PCM data streams to said first and second data channels and assigning respective bits of said 4 streams of single bit stream data to said remaining 8 data channels, for generating said ADI portion of said audio packet, containing said discrimination data, and for attaching said ADI portion to said audio data portion.

11. An encoder apparatus according to claim 10, wherein said PCM data are encoded at a sampling frequency of 48 kHz, and said single bit stream data are encoded at a bit frequency of 3.072 Mbps when said fixed number of bits has been set as 16 and are encoded at a bit frequency of 3.840 Mbps when said fixed number of bits has been set as 20.

12. A decoder apparatus for operating on a playback data stream read from an optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey, encoded as respective pulse code modulation (PCM) data streams with said fixed number of bits per data sample, first (Lt) and second (Rt) combination channel signals which in combination convey three front channel (L, C, R) analog audio signals and one rear channel (R) analog audio signal, with said front channel and rear channel analog audio signals having been encoded to form said first (Lt) and second (Rt) combination channel signals by the Dolby Surround encoding method, wherein a remaining 8 of said data channels convey said three front channel and single rear channel analog audio signals encoded by sigma-delta modulation as respective streams of single bit stream data, and wherein each of said audio packets includes an ADI (Audio Data Information) portion containing discrimination data specifying that said audio data portion of said audio packet has been recorded in said supplementary stream mode and specifying that said first and second combination channel signals have been generated by the Dolby Surround encoding method, wherein said decoder apparatus comprises mode setting means (30, 32) for selectively setting a PCM decoding mode and a single bit stream decoding mode, discrimination means (22, 32) for detecting said discrimination data of said ADI portions of said playback data stream, and for judging said discrimination data to determine whether said optical recording disk has audio data recorded thereon in said supplementary stream mode and whether said audio data include said Dolby Surround encoded data, deformatting means (41) functioning, when said discrimination means has determined that said optical recording disk has audio data recorded thereon in said supplementary stream mode and that said recorded data include said Dolby Surround encoded data, to separate said PCM data conveyed by said first and second data channels and said single bit stream data conveyed by said remaining 8 data channels of said playback data stream into a first output data stream (SA) and second output data stream (SB) respectively, and for producing only said first output data stream (SA) when said PCM decoding mode has been set and producing only said second output data stream (SB) when said single bit stream decoding mode has been set, first channel separator means (59) for separating and processing said first output data stream (SA) to obtain said first combination channel signal (Lt) and second combination channel signal (Rt) as respective PCM data streams, decoding means (60) for decoding said first and second combination channel signals to obtain four PCM data streams respectively corresponding to said four channel (L, C, R, S) analog audio signals, (digital-to-analog) converter means (61) for converting said four PCM data streams to said four channel (L, C, R, S) analog audio channel signals respectively, second channel separator means (62) for separating and processing said second output data stream (SB) into four streams of single bit stream data respectively corresponding to said four channel (L, C, R, S) analog audio signals, and low-pass filter means (63) for converting said four streams of single bit stream data to said four channel (L, C, R, S) analog audio signals.

13. An optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey, encoded as pulse code modulation (PCM) data with said fixed number of bits per data sample, a stream of combination audio data derived by encoding N-channel analog audio signals using a predetermined audio channel encoding method, where N is fixed plural integer, wherein a remaining 8 of said data channels convey said combination audio data, encoded by sigma-delta modulation as respective streams of single bit stream data, and wherein each of said audio packets includes an ADI (Audio Data Information) portion containing discrimination data to be detected by a decoder apparatus for judging whether said audio data portion of said audio packet has been recorded in said supplementary stream mode and whether said packet conveys combination audio data which have been generated by said predetermined audio channel encoding method.

14. An optical recording disk according to claim 13, wherein said PCM data are encoded at a sampling frequency of 48 kHz, and said single bit stream data are encoded at a bit frequency of 3.072 Mbps when said fixed number of bits has been set as 16 and are encoded at a bit frequency of 3.840 Mbps when said fixed number of bits has been set as 20.

15. An optical recording disk according to claim 13, wherein said predetermined audio channel encoding method is in accordance with the Dolby AC-3 multichannel audio system.

16. An optical recording disk according to claim 13, wherein said predetermined audio channel encoding method is in accordance with the DTS (Digital Theater System) multichannel audio system.

17. An optical recording disk according to claim 13, wherein said predetermined audio channel encoding method is in accordance with the SDDS (Sony Dynamic Digital Sound) multichannel audio system.

18. An encoder apparatus for generating a recording signal for recording audio data on an optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey, encoded as respective pulse code modulation (PCM) data streams with said fixed number of bits per data sample, a stream of combination audio data derived by encoding N-channel analog audio signals using predetermined audio channel encoding method, where N is a fixed plural integer, wherein a remaining 8 of said data channels convey said combination audio data, encoded by sigma-delta modulation as respective streams of single bit stream data, and wherein each of said audio packets includes an ADI (Audio Data Information) portion containing discrimination data specifying that said audio data portion of said audio packet has been recorded in said supplementary stream mode and specifying that said packet conveys combination audio data which have been generated by said predetermined audio channel encoding method, said encoder apparatus comprising sigma-delta modulation means (52) for converting said N-channel analog audio signals to respective streams of single bit stream data, encoding means (68) for encoding said streams of single bit stream data to form said combination audio data, by said predetermined audio channel encoding method, data converter means (69) for converting said combination audio data stream to a PCM data stream with said fixed number of bits per data sample, bandwidth compression means (70) for applying bandwidth compression by a factor of 2/N to each of said streams of single bit stream data, and, formatting means (71) for generating each of said audio data portions of respective audio packets by assigning respective bits of said first and second PCM data streams to said first and second data channels and assigning respective bits of each of said streams of single bit stream data to said remaining 8 data channels, for generating said ADI portion of said audio packet, containing said discrimination data, and for attaching said ADI portion to said audio data portion.

19. An encoder apparatus according to claim 18, wherein said PCM data are encoded at a sampling frequency of 48 kHz, and said single bit stream data are encoded at a bit frequency of 3.072 Mbps when said fixed number of bits has been set as 16 and are encoded at a bit frequency of 3.840 Mbps when said fixed number of bits has been set as 20.

20. A decoder apparatus for operating on a playback data stream read from an optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey, encoded as respective pulse code modulation (PCM) data streams with said fixed number of bits per data sample, a stream of combination audio data derived by encoding N-channel analog audio signals using a predetermined audio channel encoding method. where N is a fixed plural integer, wherein a remaining 8 of said data channels convey said combination audio data, encoded by sigma-delta modulation as respective streams of single bit stream data, and wherein each of said audio packets includes an ADI (Audio Data Information) portion containing discrimination data specifying that said audio data portion of said audio packet has been recorded in said supplementary stream mode and specifying that said packet conveys combination audio data which have been generated by said predetermined audio channel encoding method, wherein said decoder apparatus comprises mode setting means (30, 32) for selectively setting a PCM decoding mode and a single bit stream decoding mode, discrimination means (22, 32) for detecting said discrimination data of said ADI portions of said playback data stream, and for judging said discrimination data to determine whether said optical recording disk has audio data recorded thereon in said supplementary stream mode and whether said audio data include combination audio data encoded by said predetermined audio channel encoding method, deformatting means (41) functioning, when said discrimination means has determined that said optical recording disk has audio data recorded thereon in said supplementary stream mode and that said recorded data include said combination audio data encoded by said predetermined audio channel encoding method, to separate said PCM data conveyed by said first and second data channels and said single bit stream data conveyed by said remaining 8 data channels of said playback data stream into a first output data stream (SA) and second output data stream (SB) respectively, and for producing only said first output data stream (SA) when said PCM decoding mode has been set and producing only said second output data stream (SB) when said single bit stream decoding mode has been set, decoding means (78) for operating on said first output data stream (SA) to obtain N streams of PCM audio data respectively corresponding to said N-channel analog audio signals, N-channel analog-to-digital converter means (79) for converting said N channels of PCM audio data to said N-channel analog audio signals, channel separator means (80) for separating and processing said second output data stream (SB) into N streams of single bit stream data respectively corresponding to said N-channel analog audio signals, and N low-pass filters (81) for respectively converting said N streams of single bit stream data to said N channel analog audio signals.

21. An optical recording disk having recorded thereon successive portions of a stream of digitally encoded audio data, utilizing a stream mode which combines pulse code modulation (PCM) data and single bit stream data, wherein said stream comprises a cyclically recurring sequence of N sets of B bits where N and B are respective fixed values, said sets respectively corresponding to N data channels, wherein first and second ones of said N data channels respectively convey left (L) channel (R) channel analog audio signals respectively encoded as pulse code modulation (PCM) data with B bits per data sample, a first half of remaining (N−2) of said data channels convey said L channel analog audio signal encoded by sigma-delta modulation as single bit stream data, and a second half of said remaining (N−2) data channels convey said R analog audio signal channel encoded as single bit stream data, and wherein each of said sets of B bits is linked to an ADI (Audio Data Information) portion containing discrimination data to be detected by a decoder apparatus for judging whether said each set of B bits conveys audio data in said stream mode.

22. A decoder apparatus for operating on a playback data stream read from an optical recording disk having recorded thereon successive portions of a stream of digitally encoded audio data, as respective audio data portions of successive audio packets, in a stream mode which is supplementary to existing stream modes having from 1 to 8 data channels that are established for audio packets recorded in PCM form in accordance with a DVD (Digital Video Disk) standard, said supplementary stream mode comprising a cyclically recurring sequence of 10 sets of a fixed number of bits, where said fixed number is either 16 or 20, said sets respectively corresponding to 10 data channels, wherein first and second ones of said 10 data channels respectively convey left (L) and right (R) channel analog audio signals respectively encoded as pulse code modulation (PCM) data streams with said fixed number of bits per data sample, and a remaining 8 of said data channels convey said L channel analog audio signal and said R channel analog audio signal encoded by sigma-delta modulation as respective streams of single bit stream data, wherein each of said audio packets includes an ADI (Audio Data Information) portion containing discrimination data specifying that said audio data portion of said audio packet has been recorded in said supplementary stream mode, wherein said PCM data have been encoded at a sampling frequency of 44.1 kHz, and said single bit stream data have been encoded at a bit frequency of 3.072 Mbps when said fixed number of bits has been set as 16 and have been encoded at a bit frequency of 3.840 Mbps when said fixed number of bits has been set as 20, and wherein a number of audio data bits of said PCM data of each of said first and second data channels in each of said audio data portions has been made equal to a total number of bits of said PCM data multiplied by a factor (44.1/48), through insertion of a predetermined number of padding bits in said PCM data of each of said first and second data channels, and wherein said discrimination data of each said ADI portion further contains sampling frequency indication data specifying that said PCM data have been generated at a sampling frequency of 44.1 kHz, said decoder apparatus comprising mode setting means (30, 32) for selectively setting a PCM decoding mode and a single bit stream decoding mode, discrimination means (22, 32) for detecting said discrimination data of said ADI portions of said playback data stream, and for judging said discrimination data to determine whether said optical recording disk has audio data recorded thereon in said supplementary stream mode, deformatting means (41) functioning, when said discrimination means has determined that said optical recording disk has audio data recorded thereon in said supplementary stream mode, to separate said PCM data conveyed by said first and second data channels and said single bit stream data conveyed by said remaining 8 data channels of said playback data stream into a first output data stream (SA) and second output data stream (SB) respectively, and for producing only said first output data stream (SA) when said PCM decoding mode has been set and producing only said second output data stream (SB) when said single bit stream decoding mode has been set, first channel separator means (42) for separating and processing said first output data stream (SA) into a stream of PCM data corresponding to said L channel analog audio signal and a stream of PCM data corresponding to said R channel analog audio signal, first and second D/A (Digital-to-Analog) converter means (44, 45) for respectively converting said streams of PCM samples corresponding to said L channel analog audio signal and R channel analog audio signal to said L and R channel analog audio signals respectively, second channel separator means (43) for separating and processing said second output data stream (SB) into a stream of single bit stream data corresponding to said L channel analog audio signal and a stream of single bit stream data corresponding to said R channel analog audio signal, and first and second low-pass filters (46, 47) for respectively converting said streams of single bit stream data corresponding to said L channel analog audio signal and R channel analog audio signal to said L channel and R channel analog audio signals.

\* \* \* \* \*